United States Patent
Nakamura

(10) Patent No.: US 8,659,795 B2
(45) Date of Patent: Feb. 25, 2014

(54) IMAGE PROCESSING APPARATUS AND IMAGE PROCESSING SYSTEM

(75) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 13/550,837

(22) Filed: Jul. 17, 2012

(65) Prior Publication Data

US 2013/0021628 A1 Jan. 24, 2013

(30) Foreign Application Priority Data

Jul. 22, 2011 (JP) ................................. 2011-161261

(51) Int. Cl.
*H04N 1/60* (2006.01)
(52) U.S. Cl.
USPC ............ 358/1.9; 358/504; 358/518; 382/162; 382/164; 382/167
(58) Field of Classification Search
None
See application file for complete search history.

(56) References Cited

U.S. PATENT DOCUMENTS

| | | | | |
|---|---|---|---|---|
| 6,058,207 A | * | 5/2000 | Tuijn et al. | 382/162 |
| 7,965,322 B2 | * | 6/2011 | Gill | 348/223.1 |
| 7,978,366 B2 | | 7/2011 | Ming | |
| 8,111,430 B2 | * | 2/2012 | Kodama | 358/3.24 |
| 8,229,211 B2 | * | 7/2012 | Cherna et al. | 382/162 |
| 8,421,817 B2 | * | 4/2013 | Matsuura | 345/594 |
| 8,520,939 B2 | * | 8/2013 | Hong et al. | 382/164 |
| 2007/0165257 A1 | | 7/2007 | Owaku | |
| 2009/0153906 A1 | * | 6/2009 | Ito | 358/3.01 |
| 2010/0295996 A1 | * | 11/2010 | Chen et al. | 348/606 |
| 2012/0213437 A1 | * | 8/2012 | Sasaki | 382/167 |

FOREIGN PATENT DOCUMENTS

| | | |
|---|---|---|
| JP | 2001-119592 | 4/2001 |
| JP | 2003-094594 | 4/2003 |
| JP | 2007-194850 | 8/2007 |
| JP | 2009-177790 | 8/2009 |

* cited by examiner

*Primary Examiner* — Dung Tran
(74) *Attorney, Agent, or Firm* — IPUSA, PLLC

(57) ABSTRACT

An image processing apparatus for performing color tone conversion on a predetermined original image data using a predetermined color tone conversion parameter, includes a converted image data generating unit that generates weight-applied converted original image data obtained by performing the color tone conversion by the color tone conversion parameter while applying weighted values, which is determined such that the lower the degree to be changed by the color tone conversion is, the smaller the value becomes, on the original image data for each of a predetermined range.

14 Claims, 26 Drawing Sheets

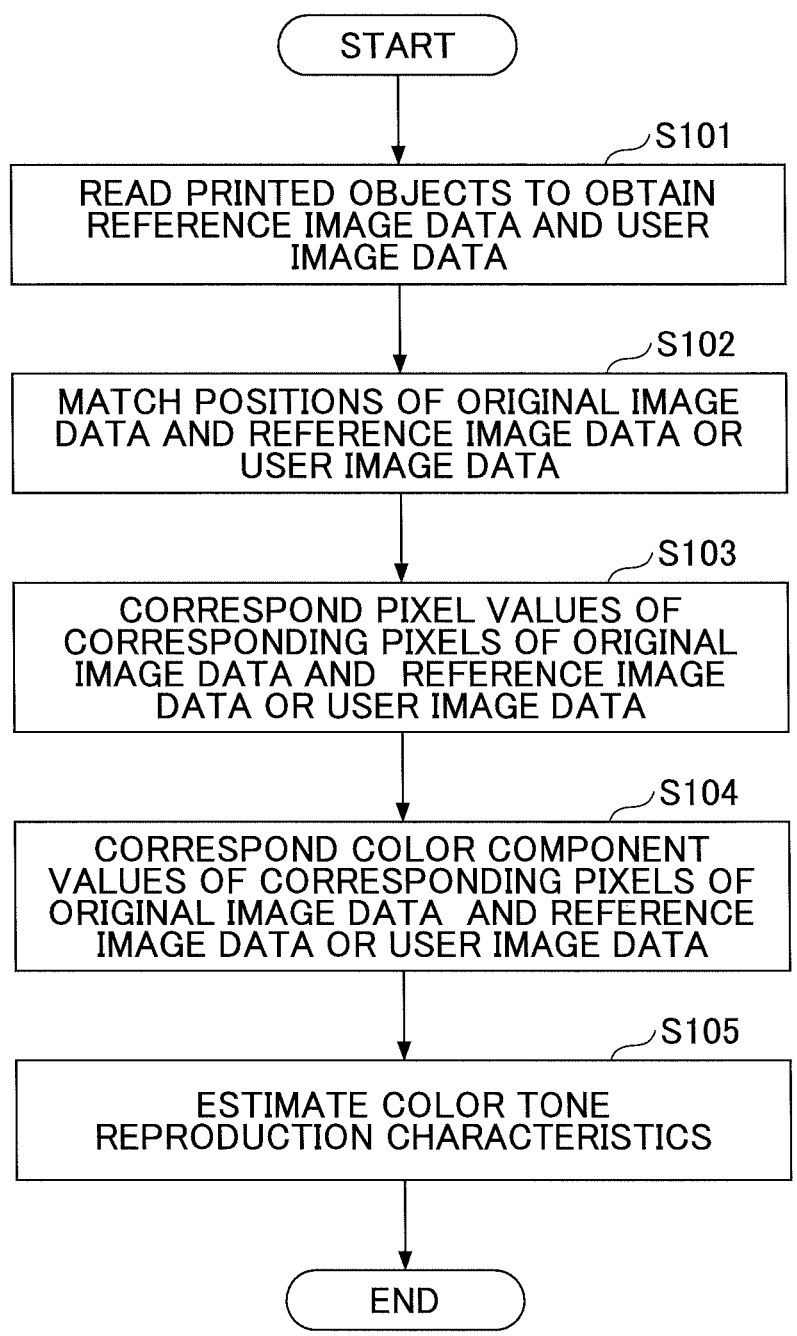

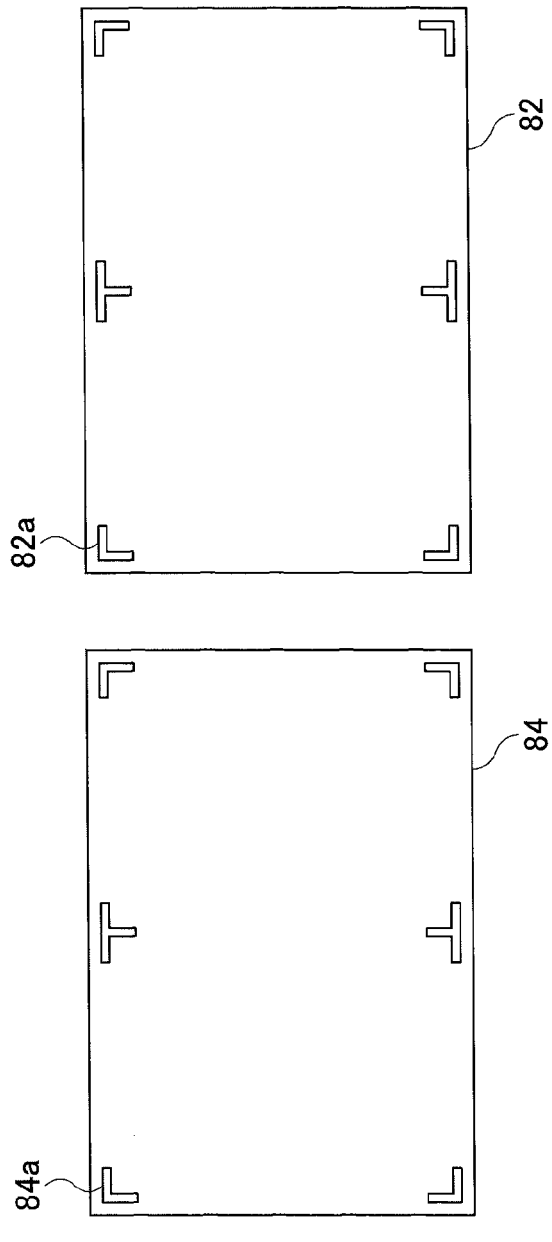
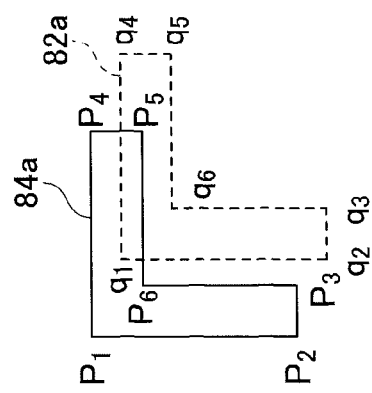
FIG.12A
FIG.12B

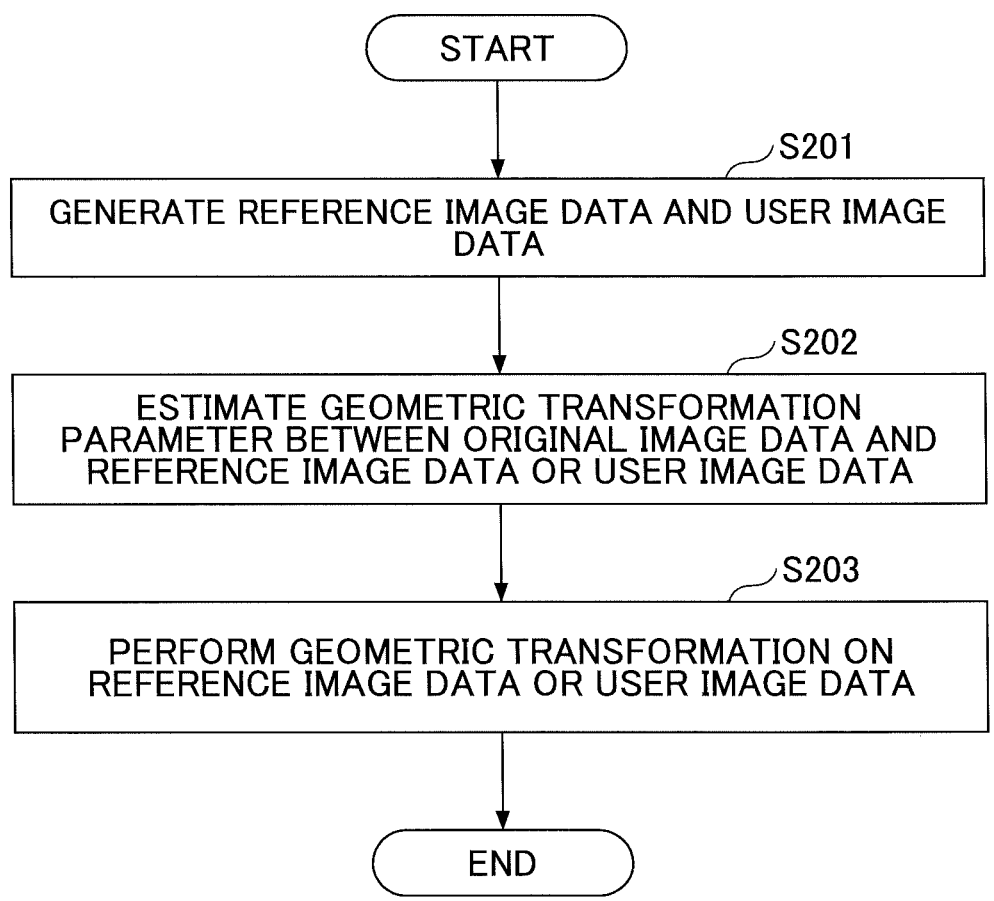

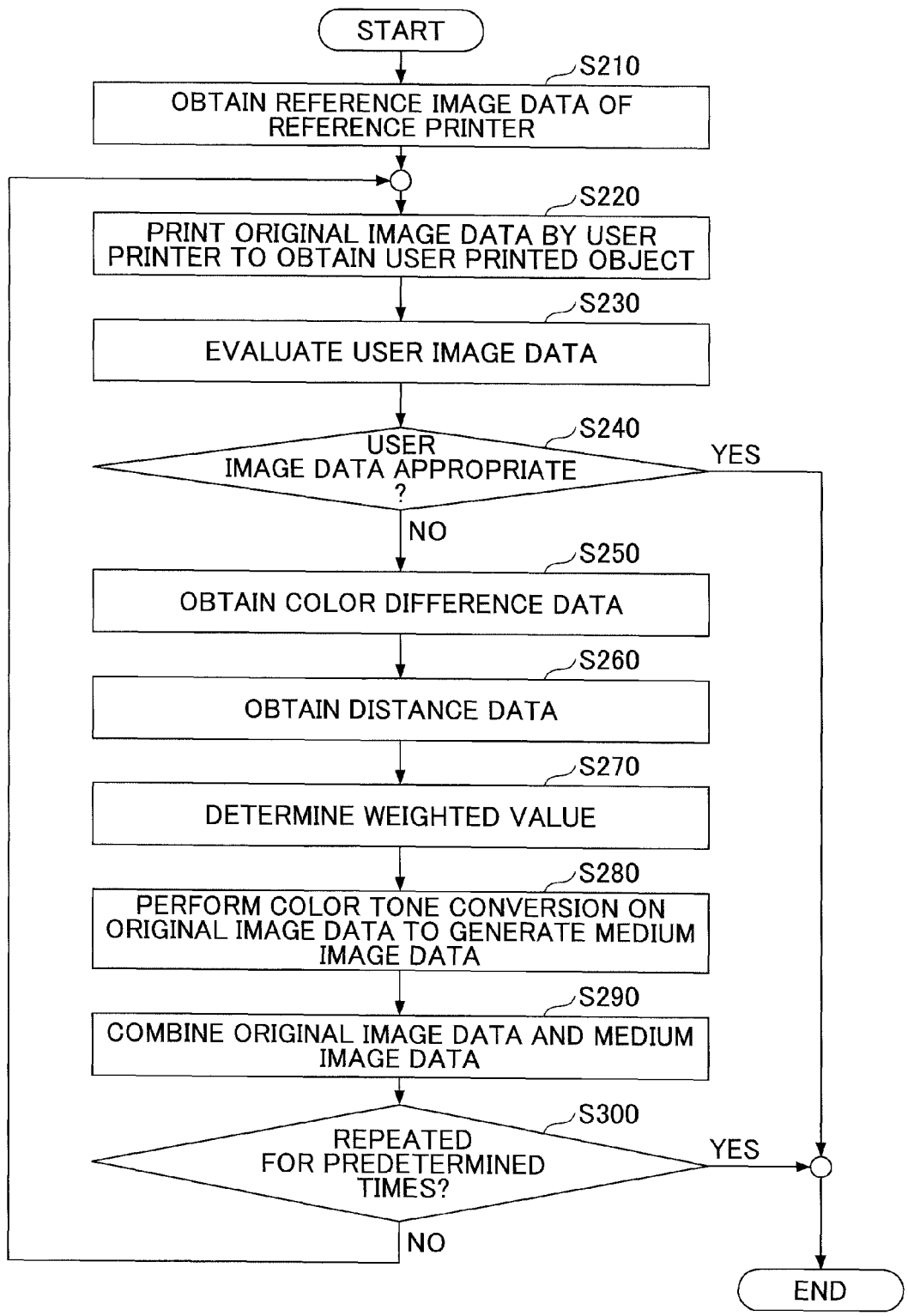

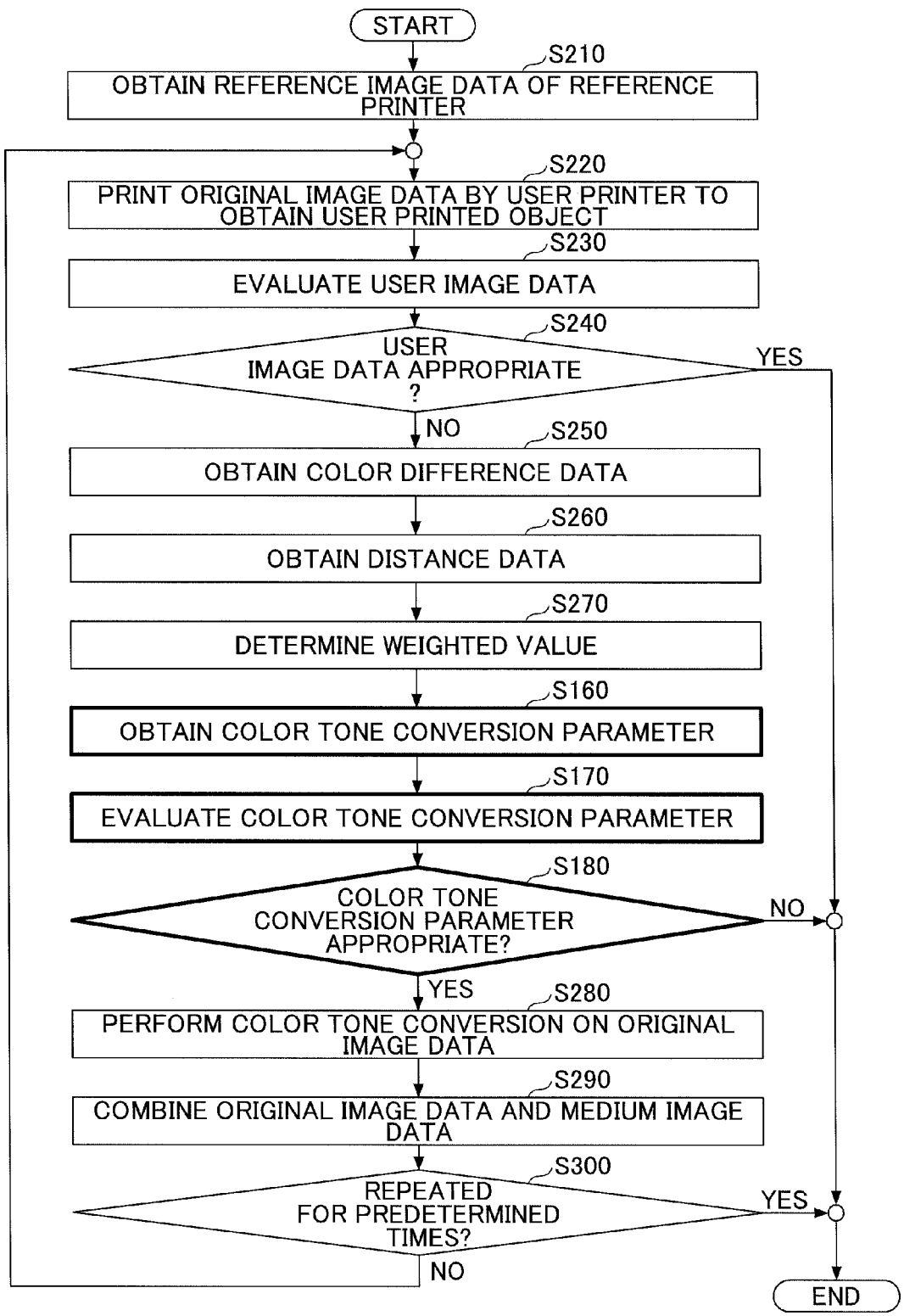

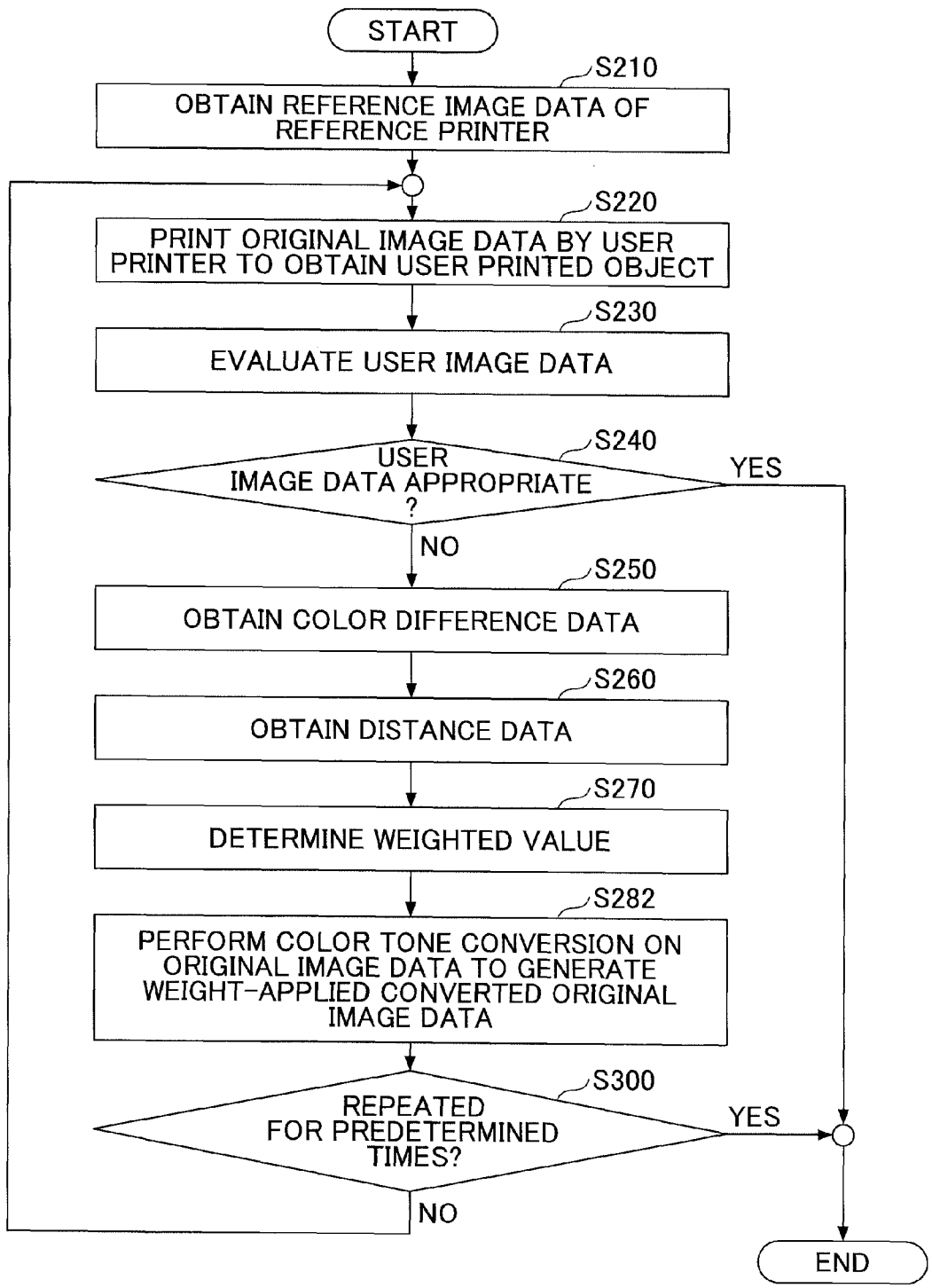

IMAGE PROCESSING APPARATUS AND IMAGE PROCESSING SYSTEM

BACKGROUND OF THE INVENTION

1. Field of the Invention

The present invention relates to an image processing apparatus and an image processing system.

2. Description of the Related Art

For an image output apparatus such as a printer, a display or the like, a case may be where it is necessary to reproduce color tones of an original document in accordance with pixel values of original image data obtained from the original document or the like. Thus, a correction of a color profile of the image output apparatus may be performed by measuring pixel values of the original document and the output result, which is output by the image output apparatus, by a colorimeter and comparing the pixel values. Specifically, in order to update the color profile of the image output apparatus, first, reference color chart data whose pixel values are known is output by the image output apparatus. Then, the output color chart is read by a colorimeter such as a scanner device or the like. Subsequently, the color profile of the image output apparatus is updated based on the comparison between the read color chart data and the original reference color chart data (see Patent Document 1, for example).

However, if the reference color chart data or the output result of the reference color chart data is not obtained, the color profile of the image output apparatus cannot be appropriately updated. For example, when updating the color profile of a target image output apparatus to match the color profile of a reference image output apparatus, it is necessary for both of the image output apparatuses to output the reference color chart data. However, there may be a case where the reference image output apparatus cannot output the reference color chart data, or a case where the output result of the reference color chart data output by the reference image output apparatus cannot be obtained at the target image output apparatus side.

For example, a case is assumed where a printing contractor accepts an order from a customer to print a document such that the color tones of the printed document match the color tones of the document obtained by a printer of the customer. If the customer can provide the printed object of the reference color chart data printed by the printer of the customer, the printing contractor may easily respond to the request by the customer. However, if such a printed object is not provided, the printing contractor needs to match color tones by a manual operation.

Further, even when color tone conversion is performed, unfortunately, there is still a case where an appropriate color tone cannot be obtained.

Patent Document

[Patent Document 1] Japanese Laid-open Patent Publication No. 2009-177790

SUMMARY OF THE INVENTION

The present invention is made in light of the above problems, and provides an image processing apparatus and an image processing system capable of appropriately correcting color tones of a user image output apparatus by suppressing unnecessary color tone conversion.

According to an embodiment, there is provided an image processing apparatus for performing color tone conversion on a predetermined original image data using a predetermined color tone conversion parameter which is adjusted such that color tones of an output result obtained by outputting the original image data after being performed with the color tone conversion parameter by a target image output unit reproduces color tones of a reference output result, including: a converting degree parameter obtaining unit that obtains a converting degree parameter expressing a degree to be changed by the color tone conversion for each of a predetermined range of the original image data based on at least one of the original image data, reference image data obtained from the reference output result and target image data obtained from a target output result which is obtained by outputting the original image data by the target image output apparatus; a weighted value determination unit that determines weighted values for each of the predetermined range such that the lower the degree to be changed by the color tone conversion is, the smaller the value becomes, based on the converting degree parameter obtained by the converting degree parameter obtaining unit; and a converted image data generating unit that generates weight-applied converted original image data obtained by performing the color tone conversion by the color tone conversion parameter while applying the weighted values, on the original image data for each of the predetermined range.

According to another embodiment, there is provided an image processing system including: a target image output unit that outputs a predetermined original image data obtained from a reference output result as a target output result; a reading unit that reads the target output result; a data processing apparatus that performs color tone conversion on the original image data using a predetermined color tone conversion parameter which is adjusted such that color tones of an output result obtained by outputting the original image data after being performed with the color tone conversion parameter by the target image output unit reproduces color tones of the reference output result, including, a converting degree parameter obtaining unit that obtains a converting degree parameter expressing a degree to be changed by the color tone conversion for each of a predetermined range of the original image data based on at least one of the original image data, reference image data obtained from the reference output result and target image data obtained from a target output result which is obtained by outputting the original image data by the target image output apparatus, a weighted value determination unit that determines weighted values for each of the predetermined range such that the lower the degree to be changed by the color tone conversion is, the smaller the value becomes, based on the converting degree parameter obtained by the converting degree parameter obtaining unit; and a converted image data generating unit that generates weight-applied converted original image data obtained by performing the color tone conversion by the color tone conversion parameter while applying the weighted values, on the original image data for each of the predetermined range.

Note that also arbitrary combinations of the above-described constituents, and any exchanges of expressions in the present invention, made among method, device, system, recording medium, computer program and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 11 is a flowchart showing an example of processes in which a color tone conversion system estimates color tone reproduction characteristics data;

FIG. 12A and FIG. 12B are views showing an example of alignment markers;

FIG. 19 is a flowchart showing an example of processes in which a color tone conversion system generates pixel coordinate correspondence data;

FIG. 20 is a flowchart showing an example of processes in which a color tone conversion system performs the color tone conversion;

FIG. 25 is a flowchart showing an example of a process in which a color tone conversion system performs a color tone conversion; and FIG. 26 is a flowchart showing an example of a process in which a color tone conversion system performs a color tone conversion.

DETAILED DESCRIPTION OF THE PREFERRED EMBODIMENTS

Figure 1:
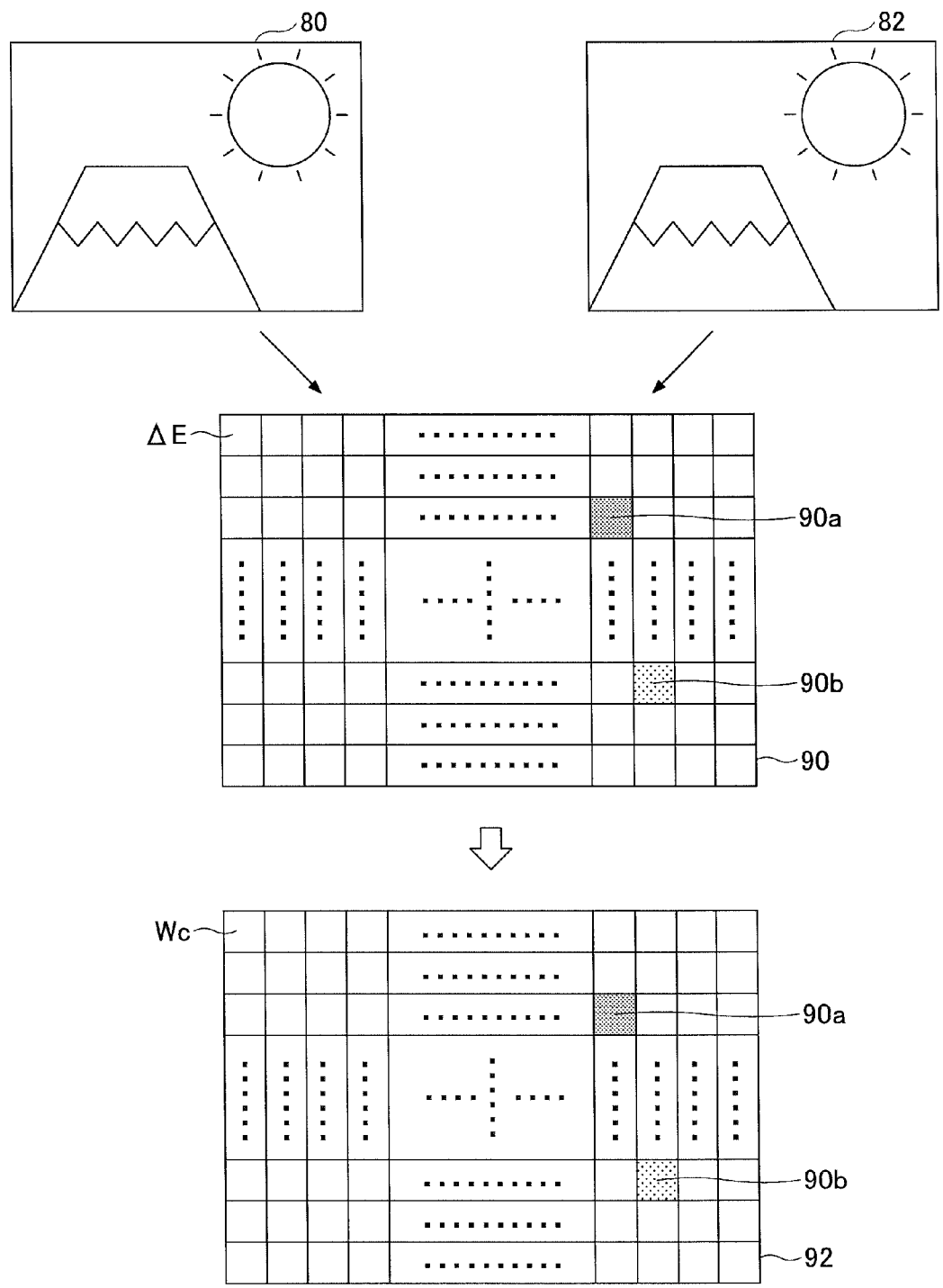
FIG. 1 is a view for explaining an example of a process of color tone conversion of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

In the following embodiment, color tone conversion is performed on predetermined original image data using a predetermined color tone conversion parameter which is adjusted such that color tones of an output result obtained by outputting the original image data by a target image output apparatus reproduces color tones of a reference output result.

However, if the color tone conversion is performed on the entirety of the original image data, there may be a problem that a color tone of a part (which will be referred to as an "originally matched part" hereinafter) where the color tone in reference image data and target image data originally match is also changed to be worse, or a color tone is added even to a part (which will be referred to as an "originally achromatic part" hereinafter) with achromatic color in the original image data, the reference image data, or the target image data. It means that by performing the color tone conversion on the entirety of the original image data, although it can be expected that the color tones of the output result by the target output apparatus become similar to those of the reference output result as a whole, matching of the color tone at the originally matched part becomes lowered or a color tone is added to the originally achromatic part.

Specifically, when a target image output apparatus tends to strongly output blue color, and a color tone conversion for reducing blue color is performed on the original image data, an originally white part is converted to yellow color in the converted original image data. For a case when the target image output apparatus is a printer, ink of the printer is not applied for the originally white part when the printer prints the original image data. However, when the printer prints the converted original image data, the originally white part becomes yellow in a printed object.

Thus, in the following embodiment, a converting degree parameter expressing a degree to be changed by the color tone conversion is obtained for each of a predetermined range of the original image data, weighted values are determined such that the lower the degree to be changed by the color tone conversion is, the smaller the value becomes based on the converting degree parameter, and the color tone conversion is performed on the original image data using the color tone conversion parameter while applying the weighted values for each of the predetermined range to obtain weight-applied converted original image data.

Examples of the converting degree parameter are explained in the following.

(1) Weighting Based on a Color Difference

FIG. 1 is a view for explaining an example of a process of color tone conversion of the embodiment.

In this example, color tone conversion is controlled not to be performed on the originally matched part.

Although not shown in FIG. 1, original image data is previously prepared. Reference image data 80 is obtained by outputting the original image data by a reference image output apparatus, and reading the output result by an image reading apparatus. Similarly, user image data 82 is obtained by outputting the original image data by a user image output apparatus, and reading the output result by an image reading apparatus. Here, the user image output apparatus is a target image output apparatus for which the color tone conversion on the original image data is to be performed so that the color tones of an output result by the user image output apparatus after the color tone conversion become almost the same as those of the output result by the reference image output apparatus.

In this example, color difference data 90 is generated by obtaining a color difference ΔE between the reference image data 80 and the user image data 82 for each of a predetermined range. The predetermined range may be defined as m×n (row×column) where m and n are integers greater than or equal to 1, respectively. For the example shown in FIG. 1, the predetermined range corresponds to a pixel where m and n are 1, and the color difference ΔE between the reference image data 80 and the user image data 82 is obtained for each of the pixels.

Then, color difference weighted data 92 including a color difference weighted value Wc for each of the predetermined range is generated. In this embodiment, the color difference weighted data 92 controls a degree in which the original image data is changed by the color tone conversion using the predetermined color tone conversion parameter. Thus, the color difference weighted values Wc are determined such that the lower the degree to be changed by the color tone conversion is, the smaller the color difference weighted value Wc becomes. Specifically, the color difference weighted values Wc are determined such that the smaller the color difference ΔE is, the smaller the color difference weighted value Wc becomes. Thus, the color difference ΔE is an example of the converting degree parameter in this example.

For example, it is assumed that the color difference ΔE for a pixel 90a is larger than that of a pixel 90b. At this time, the color difference weighted value Wc for the pixel 90a is set larger than that of the pixel 90b.

With this structure, for the pixel (90b, for example), for which the color difference ΔE between the reference image data 80 and the user image data 82 is relatively small, a degree of color tone conversion is set smaller. Thus, the color tone conversion on the originally matched part (where the color difference ΔE is approximately close to zero) can be suppressed.

(2) Weighting Based on a Distance in Color from Achromatic Color

Figure 2:
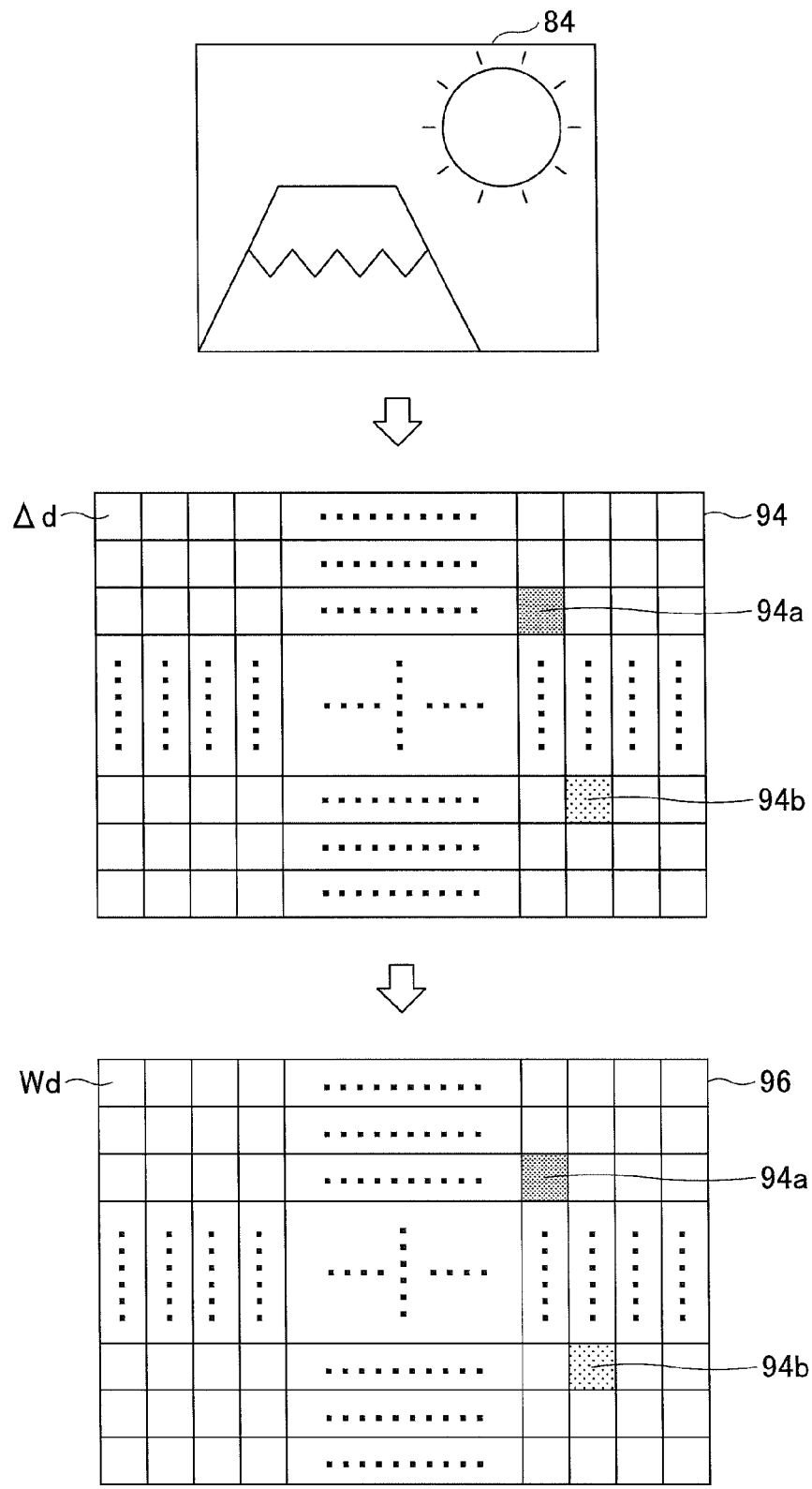
FIG. 2 is a view for explaining another example of a process of color tone conversion of an embodiment.

FIG. 2 is a view for explaining another example of a process of color tone conversion of the embodiment.

In this example, color tone conversion is controlled so as not to be performed on the originally achromatic part.

For the example shown in FIG. 2, similar to the example shown in FIG. 1, original image data 84 is previously prepared.

In this example, distance data 94 is generated by obtaining a distance in color Δd from an achromatic color for each of a predetermined range for each color component in the original image data 84. The predetermined range may be defined as m×n (row×column) where m and n are integers greater than or equal to 1, respectively. The predetermined range for the distance in color Δd may be the same range as that for the color difference ΔE explained above. For the example shown in FIG. 2, the predetermined range corresponds to a pixel where m and n are 1, and the distance in color Δd is obtained for each of the pixels. The color component will be explained later. The distance data 94 may be obtained from the reference image data 80 or the user image data 82.

Then, distance weighted data 96 including a distance weighted value Wd for each of the predetermined range of each color component is generated. In this embodiment, the distance weighted data 96 controls a degree in which the original image data 84 is changed by color tone conversion using the predetermined color tone conversion parameter.

Thus, the distance weighted values Wd are determined such that the lower the degree to be changed by the color tone conversion is, the smaller the distance weighted value Wd becomes. Specifically, the distance weighted values Wd are determined such that the smaller the distance in color Δd is, the smaller the distance weighted value Wd becomes. Thus, the distance in color Δd is an example of the converting degree parameter in this example.

For example, it is assumed that the distance in color Δd for a pixel 94a is larger than that of a pixel 94b. At this time, the distance weighted value Wd for the pixel 94a is set larger than that of the pixel 94b.

With this structure, for the pixel (94b, for example), for which the distance in color Δd is relatively small, a degree of color tone conversion is set smaller. Thus, the color tone conversion on the originally achromatic part (where the distance in color Δd is approximately close to zero) can be suppressed.

Both the color difference weighted data 92 and the distance weighted data 96 may be used at the same time, however, only one of the color difference weighted data 92 and the distance weighted data 96 may be used.

(Color Tone Conversion Parameter)

Generation of a color tone conversion parameter is explained. In the following, an example where the color tone conversion parameter is generated under a condition that the reference color chart data whose pixel values are known is not output by a user image output apparatus. The following method of generating the color tone conversion parameter is just an example and other methods may be used as well.

Figure 3:
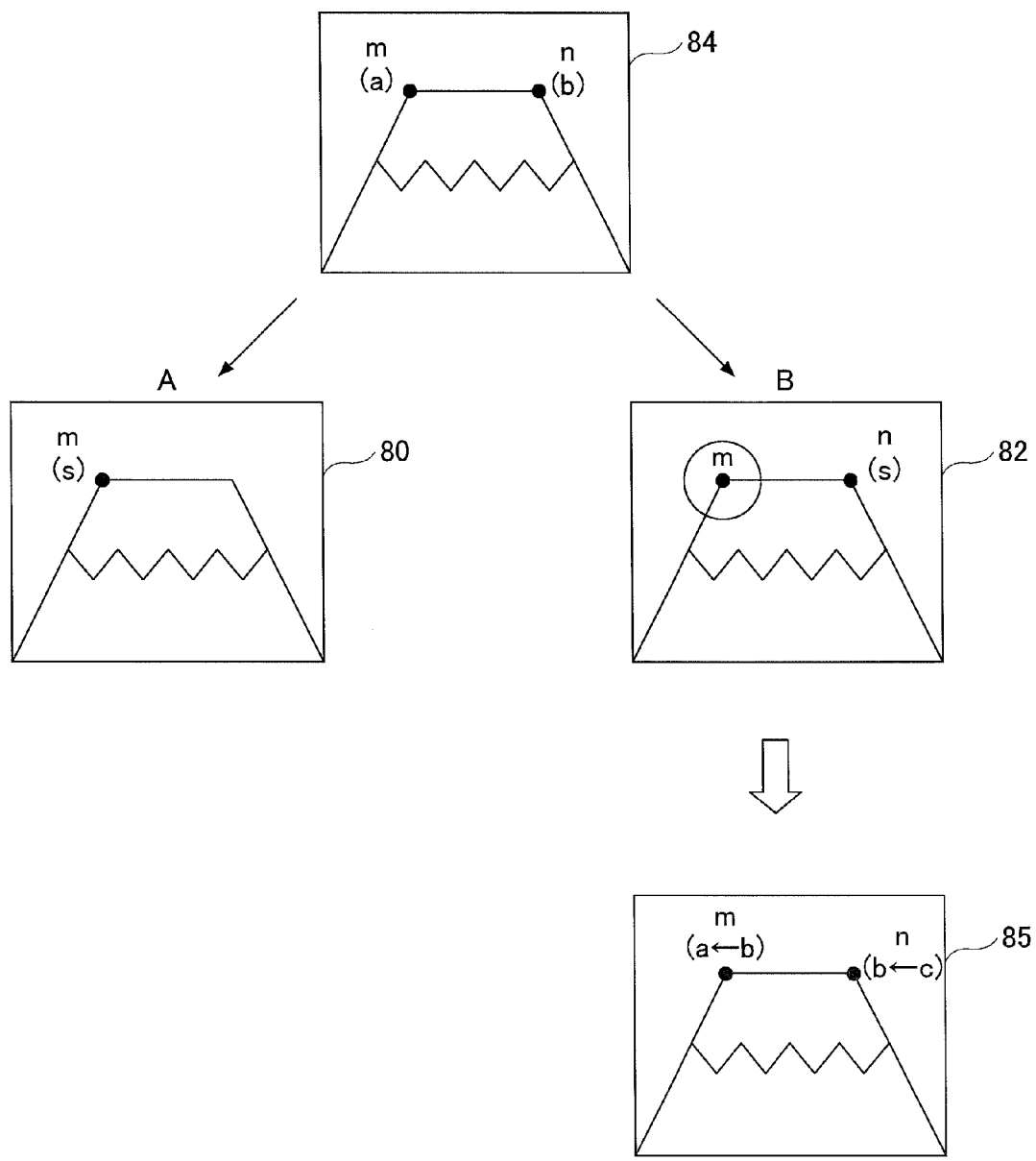
FIG. 3 is a view schematically showing a color tone conversion between a color tone "a" and a color tone "b"

FIG. 3 is a view schematically showing a color tone conversion between a pixel value (color tone) "a" and a pixel value (color tone) "b".

In this embodiment, two image output apparatus, a reference image output apparatus A and a user image output apparatus B, and an image reading apparatus C (not shown in FIG. 3) are used (not shown in the drawings). In this example, the reference image output apparatus A and the user image output apparatus B are exemplified as a printer, respectively. Further, the image reading apparatus C is exemplified as a scanner device. It is assumed that the reference image output apparatus A prints a reference printed object with ideal color tones, and the user image output apparatus B prints a user printed object which requires a correction.

Here, it is defined that;

color tone reproduction characteristics of the reference image output apparatus A is $P_1(x)$, color tone reproduction characteristics of the user image output apparatus B is $P_2(x)$, and color tone reproduction characteristics of the image reading apparatus C is $S(x)$.

Here, "x" is an input pixel value or an input color tone. As there are various kinds of color spaces, the pixel value does not directly express the color itself, however, as long as considering values in the same color space, it can be said that the pixel value can express the color. In the following, the "pixel value" includes a meaning of a color tone as well.

For the example shown in FIG. 3, the reference image output apparatus A and the user image output apparatus B respectively print the original image data 84.

Thus, the color tone reproduction characteristics of the reference image data 80, which is obtained by printing the original image data 84 by the reference image output apparatus A and reading the printed object by the image reading apparatus C, can be expressed as $S(P_1(x))$ where "x" is the pixel value of the corresponding pixel of the original image data 84.

Similarly, the color tone reproduction characteristics of the user image data 82, which is obtained by printing the original image data 84 by the user image output apparatus B and reading the printed object by the image reading apparatus C, can be expressed as $S(P_2(x))$ where "x" is the pixel value of the corresponding pixel of the original image data 84.

In other words, $P_1(x)$ expresses a color tone of the pixel, whose pixel value in the original image data 84 is "x", of the printed object printed by the reference image output apparatus A, and $S(P_1(x))$ expresses a pixel value of the corresponding pixel of the reference image data 80 read by the image reading apparatus C. Similarly, $P_2(x)$ expresses a color tone of the pixel, whose pixel value in the original image data 84 is "x", of the printed object printed by the user image output apparatus B, and $S(P_2(x))$ expresses a pixel value of the corresponding pixel of the user image data 82 read by the image reading apparatus C.

When the color tone reproduction characteristics $P_1(x)$ and $P_2(x)$ are different, even when a pixel, whose pixel value in the original image data 84 is "x", is printed by the reference image output apparatus A and the user image output apparatus B, respectively, $S(P_1(x))$ and $S(P_2(x))$ become different. However, there may be a case where $S(P_2(b))$ becomes substantially the same as $S(P_1(a))$ where the reference image output apparatus A prints a pixel, whose pixel value in the original image data 84 is "a", and the user image output apparatus B prints another pixel, whose pixel value in the original image data 84 is "b" which is different from "a" ($S(P_2(b))$ and $S(P_1(a))$ may not be completely the same).

According to the embodiment, an image processing apparatus obtains one or more of such a pair of combinations (a, b) where $S(P_2(b))$ of the user image data 82 becomes substantially the same as $S(P_1(a))$ of the reference image data 80.

Here, it is a goal for the image processing apparatus of the embodiment to have the pixel values (color tones) of the printed object printed by the user image output apparatus B match those of the printed object printed by the reference image output apparatus A. Thus, if the pixel value $S(P_2(b))$ of the pixel, whose pixel value in the original image data 84 is "b", of the user image data 82 becomes substantially the same as the pixel value $S(P_1(a))$ of the pixel, whose pixel value in the original image data 84 is "a", of reference image data 80, the pixel value of the original image data 84 may be substituted from "a" to "b" for the user image output apparatus B. With this operation, the value of the pixel, whose original pixel value in the original image data 84 is "a" but now substituted to "b" becomes $S(P_2(b))$ in a new user image data, which becomes substantially the same as the pixel value of the corresponding pixel of the reference image data 80.

This operation is explained with reference to FIG. 3. It is assumed that a pixel value of a pixel "m", whose pixel value in the original image data 84 is "a", becomes "s" in the reference image data 80. Further, it is assumed that a pixel value of a pixel "n", whose pixel value in the original image data 84 is "b", becomes "s" in the user image data 82. When the color tone reproduction characteristics of the user image output apparatus B is set to match that of the reference image output apparatus A, the user image output apparatus B is to print the original image data 84 such that the pixel value of the pixel "m" becomes pixel value "s" in the user image data 82. Thus, for the user image output apparatus B, the original image data 84 is converted such that the pixel value of the pixel "m" is substituted from "a" to "b", as shown in the converted original image data 85. Similarly, in the converted original image data 85, the pixel value of the pixel "n" may also be substituted from "b" to "c", where $S(P_2(c))$ is substantially the same as $S(P_1(b))$. Then, the user image output apparatus B prints the converted original image data 85 instead of the original image data 84.

With this color tone conversion, the user image output apparatus B becomes able to provide a printed object having substantially the same color tones of a printed object printed by the reference image output apparatus A.

Figure 4A:
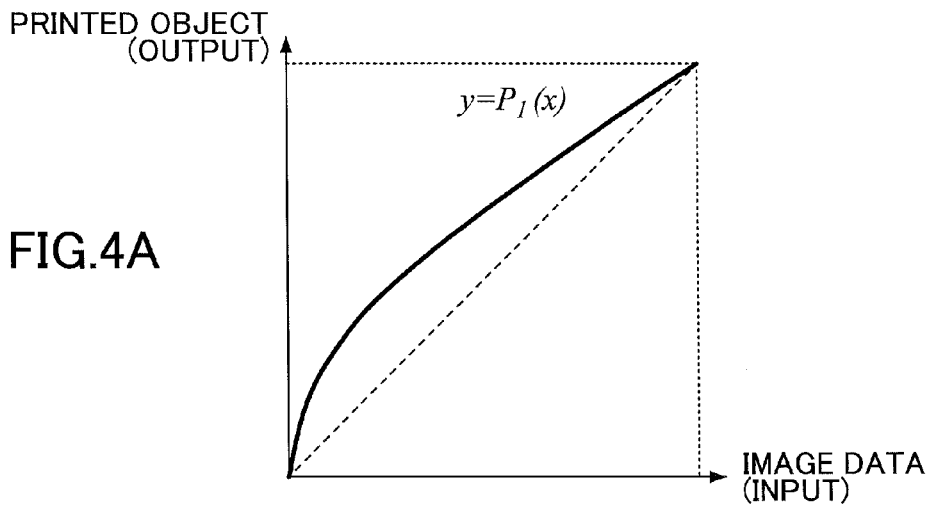
FIG. 4A to FIG. 4C are views schematically showing an example of color tone reproduction characteristics.

Generation of the color tone conversion parameter is further explained with reference to drawings. FIG. 4A is a view schematically showing an example of color tone reproduction characteristics of the reference image output apparatus A.

The color tone reproduction characteristics of the reference image output apparatus A can be determined based on how the reference image output apparatus A allocates a color tone of input image data to be printed to a color tone in a printed object. In FIG. 4A, axis of abscissas express color tones of the image data and axis of ordinates express color tones of the printed object printed by the reference image output apparatus A based on the image data. The color tone reproduction characteristics of the reference image output apparatus A can be expressed as a solid line shown in FIG. 4A.

A dotted line expresses an ideal color tone reproduction characteristics by which the color tone of the image data and the color tone of the printed object become the same. By comparing the dotted line and the solid line in FIG. 4A, the darker part, at smaller values, of the image data is expressed in detail with a larger number of pixel values while the brighter part of the image data is compressed in the printed object.

Figure 4B:
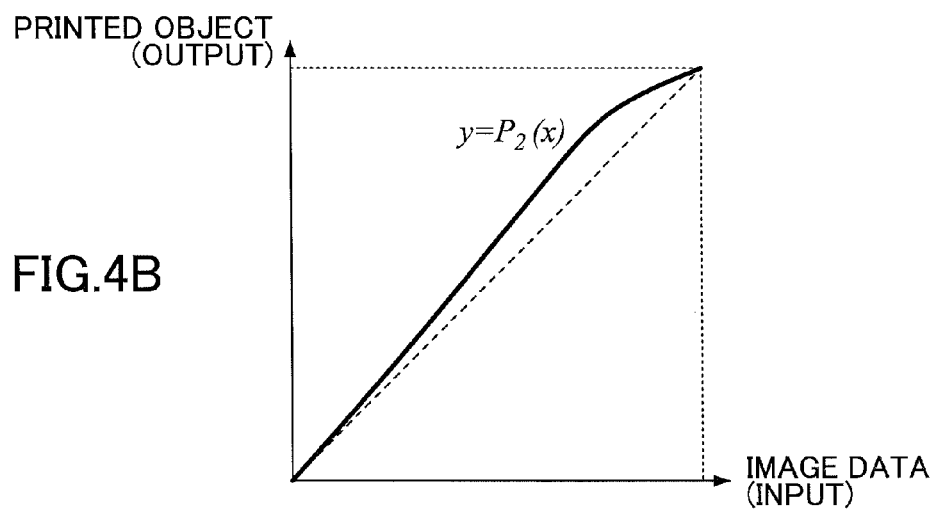

FIG. 4B is a view schematically showing an example of color tone reproduction characteristics of the user image output apparatus B.

For the user image output apparatus B, the color tone reproduction characteristics can be expressed as a solid line shown in FIG. 4B, similar to the reference image output apparatus A. By comparing the dotted line and the solid line in FIG. 4B, the brighter part, at larger values, of the image data is expressed in detail with a larger number of pixel values while the darker part of the image data is compressed in the printed object.

Figure 4C:
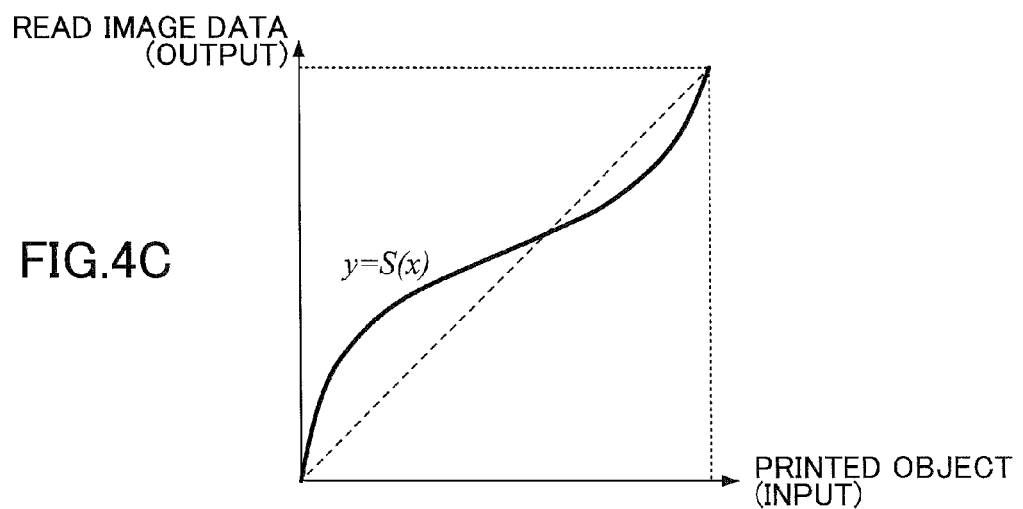

FIG. 4C is a view schematically showing an example of color tone reproduction characteristics of the image reading apparatus C.

The color tone reproduction characteristics of the image reading apparatus C can be determined based on how the image reading apparatus C allocates a color tone of the printed object to a color tone in the read image data. In FIG. 4C, axis of abscissas express color tones of the printed object and axis of ordinates express color tones of the read image data formed by the image reading apparatus C based on the printed object. The color tone reproduction characteristics of the image reading apparatus C can be expressed as a solid line shown in FIG. 4C. By comparing the dotted line and the solid line in FIG. 4C, the darker part and the brighter of the printed object are expressed in detail with a larger number of pixel values, while the middle part of the printed object is compressed in the image data.

The color tone reproduction characteristics of the reference image output apparatus A and the color tone reproduction characteristics of the user image output apparatus B can be respectively obtained as a printer profile, and the color tone reproduction characteristics of the image reading apparatus C can be obtained as a scanner device profile.

Further, for a case when the printer profiles are not provided, the color tone reproduction characteristics of the reference image output apparatus A or the color tone reproduction characteristics of the user image output apparatus B can be obtained by printing the reference color chart data by the reference image output apparatus A or the user image output apparatus B, and measuring the color tones of the printed object by a colorimeter. For a case when the scanner device profile is not provided, the color tone reproduction characteristics of the image reading apparatus C can be obtained by reading the reference color chart by the image reading apparatus C, and measuring the pixel values of the read image data. Then, the color tone conversion parameter can be obtained based on the color tone reproduction characteristics of the reference image output apparatus A, the color tone reproduction characteristics of the user image output apparatus B and the color tone reproduction characteristics of the image reading apparatus C.

Further, according to the embodiment, even for a case where for at least one of the reference image output apparatus A and the user image output apparatus B in which the printer profile is not provided and neither reference color chart data can be printed, the color tone conversion parameter can be obtained as follows.

Figure 5:
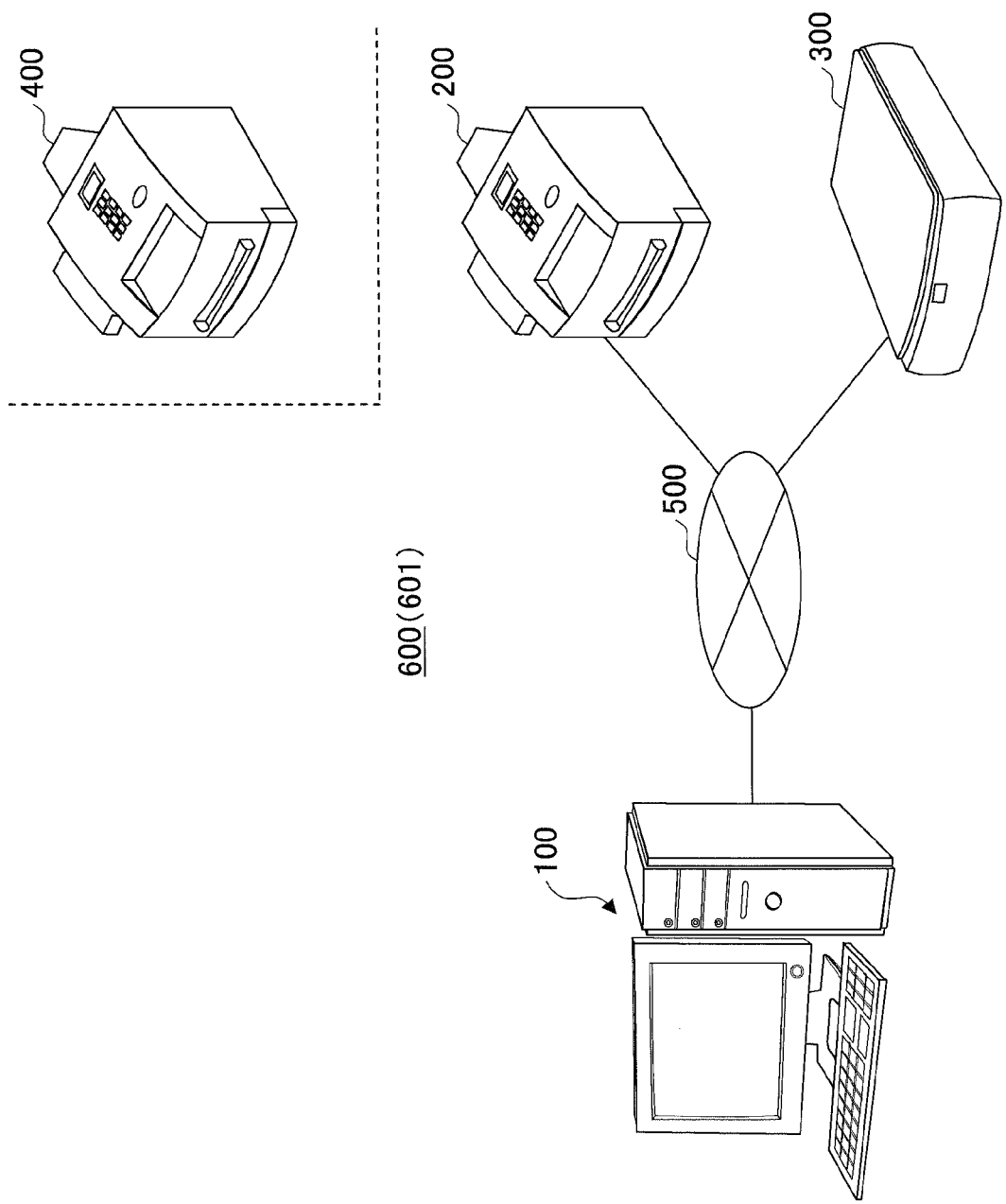
FIG. 5 is a perspective view showing an example of a structure of a color tone conversion system.

FIG. 5 is a perspective view showing an example of a structure of a color tone conversion system 600. Generation of the color tone conversion parameter is further explained in detail.

The color tone conversion system 600 includes a user printer 200 which is an example of the user image output apparatus B, a scanner device 300 which is an example of the image reading apparatus C, a computer 100 and a network 500. The computer 100, the user printer 200, and the scanner device 300 of the color tone conversion system 600 are connected via the network 500. Further, a reference printer 400 which is an example of the reference image output apparatus A is shown. In this embodiment, it is assumed that the reference printer 400 is not provided near a user of the color tone conversion system 600 and thus it is described that the reference printer 400 is not connected to the network 500. However, in an alternative example, the reference printer 400 may also be connected to the network 500.

In the following, original image data to be printed by the reference printer 400 and the user printer 200 is referred to as original image data 84 for explanation. A printed object obtained by printing the original image data 84 by the reference printer 400 is referred to as a reference printed object. Image data obtained by reading the reference printed object by the scanner device 300 is referred to as reference image data 80. A printed object obtained by printing the original image data 84 by the user printer 200 is referred to as a user printed object. Image data obtained by reading the user printed object by the scanner device 300 is referred to as user image data 82.

In this embodiment, in order to match color tones of a user printed object printed by the user printer 200 with color tones of a reference printed object printed by the reference printer 400, color tone conversion is performed on the original image data 84 to obtain converted original image data for the user printer 200. The converted original image data is referred as converted original image data 85.

In this embodiment, it is assumed that the user of the color tone conversion system 600 is capable of obtaining the reference printed object printed by the reference printer 400 based on the original image data 84.

The color tone conversion may be performed by the user printer 200, the scanner device 300, or the computer 100. In this embodiment, an example where the computer 100 generates the color tone conversion parameter is explained in the following.

(1) Estimation of Reference Color Tone Reproduction Characteristics

As it is difficult to determine the color tone reproduction characteristics $P_1(x)$ of the reference printer 400, the reference color tone reproduction characteristics $S(P_1(x))$ of the reference printer 400 and the scanner device 300 is estimated as follows.

(1-1) obtain the reference image data 80 by reading the reference printed object by the scanner device 300,
(1-2) match positions, inclination, and size of the original image data 84 and the reference image data 80,
(1-3) store pixel values of the corresponding pixels of the original image data 84 and the reference image data 80 in correspondence with each other, and
(1-4) obtain the reference color tone reproduction characteristics in which pixel values of the original image data 84 and the reference image data 80 correspond with each other.

(2) Estimation of User Color Tone Reproduction Characteristics

Similarly, the user color tone reproduction characteristics $S(P_2(x))$ of the user printer 200 and the scanner device 300 is estimated as follows.

(2-1) obtain the user printed object by printing the original image data 84 by the user printer 200,
(2-2) obtain the user image data 82 by reading the user printed object by the scanner device 300,
(2-3) match positions, inclination, and size of the original image data 84 and the user image data 82,
(2-4) store pixel values of the corresponding pixels of the original image data 84 and the user image data 82, and
(2-5) obtain the user color tone reproduction characteristics in which pixel values of the original image data 84 and the user image data 82 correspond with each other.

(3) Estimation of Color Tone Conversion Parameter

The color tone conversion parameter is obtained based on the reference color tone reproduction characteristics and the user color tone reproduction characteristics as follows.

(3-1) select a pixel value having a pixel value "a" in the original image data 84 to obtain a pixel value "s" (where $s=S(P_1(a))$) of the corresponding pixel in the reference image data 80 based on the reference color tone reproduction characteristics,
(3-2) select a pixel having the pixel value "s" (where $s=S(P_2(b))$) in the user image data 82 to obtain a pixel value "b" of the corresponding pixel in the original image data 84 based on the user color tone reproduction characteristics,
(3-3) obtain a combination (a, b) of pixel values in the original image data 84 whose pixel values are substantially the same in the reference image data 80 and the user image data 82, respectively. (As described above, for the pixel whose pixel value is "a" in the original image data 84, the pixel value in the reference image data 80 becomes "s", and for the pixel whose pixel value is "b" in the original image data 84, the pixel value in the user image data becomes "s" (i.e. $S(P_1(a))=s=S(P_2(b))$), and
(3-4) obtain the color tone conversion parameter based on the combination (a, b) of pixel values.

(4) Color Tone Conversion of the Original Image Data

Finally, the original image data 84 is processed with color tone conversion using the color tone conversion parameter to obtain the converted original image data 85 for the user printer 200.

When printing the converted original image data 85 by the user printer 200, a new user printed object or a new user image data obtained based on the new user printed object is expected to have color tones substantially the same as those of the reference printed object or the reference image data, respectively. The above processes (1) to (4) may be repeated plural times until the color difference between a new user printed object or new user image data and the reference printed object or the reference image data 80 becomes within a predetermined range, respectively. When repeating the above processes (1) to (4), the user color tone reproduction characteristics may be estimated based on the new user image data and the converted original image data which is obtained in the previous cycle.

Figure 6:
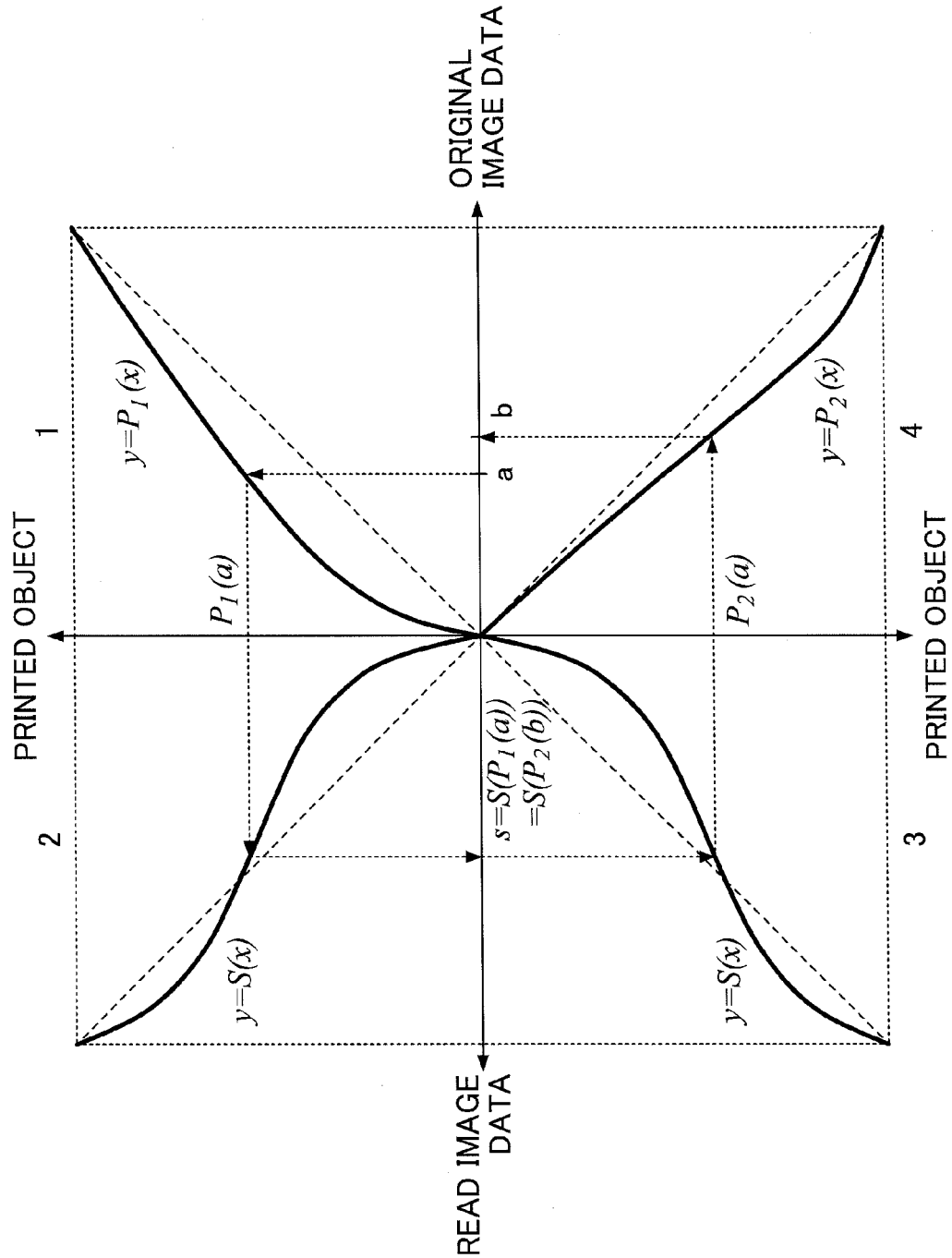
FIG. 6 is a schematic view showing an example of color tone conversion.

FIG. 6 is a view schematically showing an example of the color tone reproduction characteristics according to the above processes (1) to (3).

The color tone reproduction characteristics shown in FIG. 6 includes;

the color tone reproduction characteristics shown in FIG. 4A at a first quadrant (upper right-hand part), color tone reproduction characteristics obtained by reversing the color tone reproduction characteristics shown in FIG. 4C in the lateral direction at a second quadrant (upper left-hand part), color tone reproduction characteristics obtained by rotating the color tone reproduction characteristics shown in FIG. 4C for 180° at a third quadrant (lower left-hand part), and color tone reproduction characteristics obtained by reversing the color tone reproduction characteristics shown in FIG. 4B in the vertical direction at a fourth quadrant (lower right-hand part).

The relationship between the view shown in FIG. 6 and the above processes (1) to (3) is explained in the following.

The solid lines shown in the first quadrant and the second quadrant, respectively, are obtained in the process (1) where the reference color tone reproduction characteristics are estimated.

The solid lines shown in the third quadrant and the fourth quadrant, respectively, are obtained in the process (2) where the user color tone reproduction characteristics are estimated.

The process (3) of estimating the color tone conversion parameter where the combination (a, b) that satisfies the equation $S(P_1(a))=S(P_2(b))$ is obtained is shown by dotted arrows.

Although the reference color tone reproduction characteristics of the reference printer 400 and the scanner device 300 and the user color tone reproduction characteristics of the user printer 200 and the scanner device 300 are estimated in processes (1) and (2), in FIG. 6, the color tone reproduction characteristics of the reference printer 400, the scanner device 300 and the user printer 200 are separately shown for explanation.

(Structure)

Referring back to FIG. 5, the user printer 200 may be any kind of printer such as a laser printer, an ink-jet printer, an offset printing machine, a gravure printing machine or the like. Further, the color tone conversion system 600 may include a spectrophotometer, a camera or the like instead of the scanner device 300.

The network 500 may be any kind of network provided that the computer 100, the user printer 200, and the scanner device 300 are capable of having communication with each other. The network 500 may be an internal LAN, a wide area network (WAN), a Virtual Private Network (IP-VNP), an INTERNET VPN, the INTERNET, a combination of two or more of them, or the like. The network 500 may include a public telecommunication network as a part. Further, the network 500 may include a wired network or a wireless network.

Further, the reference printer 400 and the user printer 200 may be a same printer. For example, the embodiment is applicable to a case where current color tones are to be adjusted based on the previous color tones of the same printer, for example. Thus, the reference printer 400 and the user printer 200 may not necessarily be different printers. Further, the reference printer 400 and the user printer 200 may include one or more of a scanner device function, a faxing function, a copying function or the like in addition to the printer function, respectively. Similarly, the scanner device 300 may include one or more of a printer function, a faxing function, a copying function or the like in addition to the scanner device function. The reference printer 400, the user printer 200, and/or the scanner device 300 may be a Multifunction Peripheral (MFP) including the plural functions.

Further, the computer 100 is configured to estimate a color tone conversion parameter based on three image data, including the original image data 84 which is used by the reference printer 400 to print the reference printed object, the reference image data 80 which is obtained by reading the reference printed object by the scanner device 300, and the user image data 82 which is obtained by printing the original image data 84 by the user printer 200 and reading the printed object by the scanner device 300. The original image data 84 may be previously stored in the user printer 200, or may be obtained from the reference printer 400 or the like.

Figure 7:
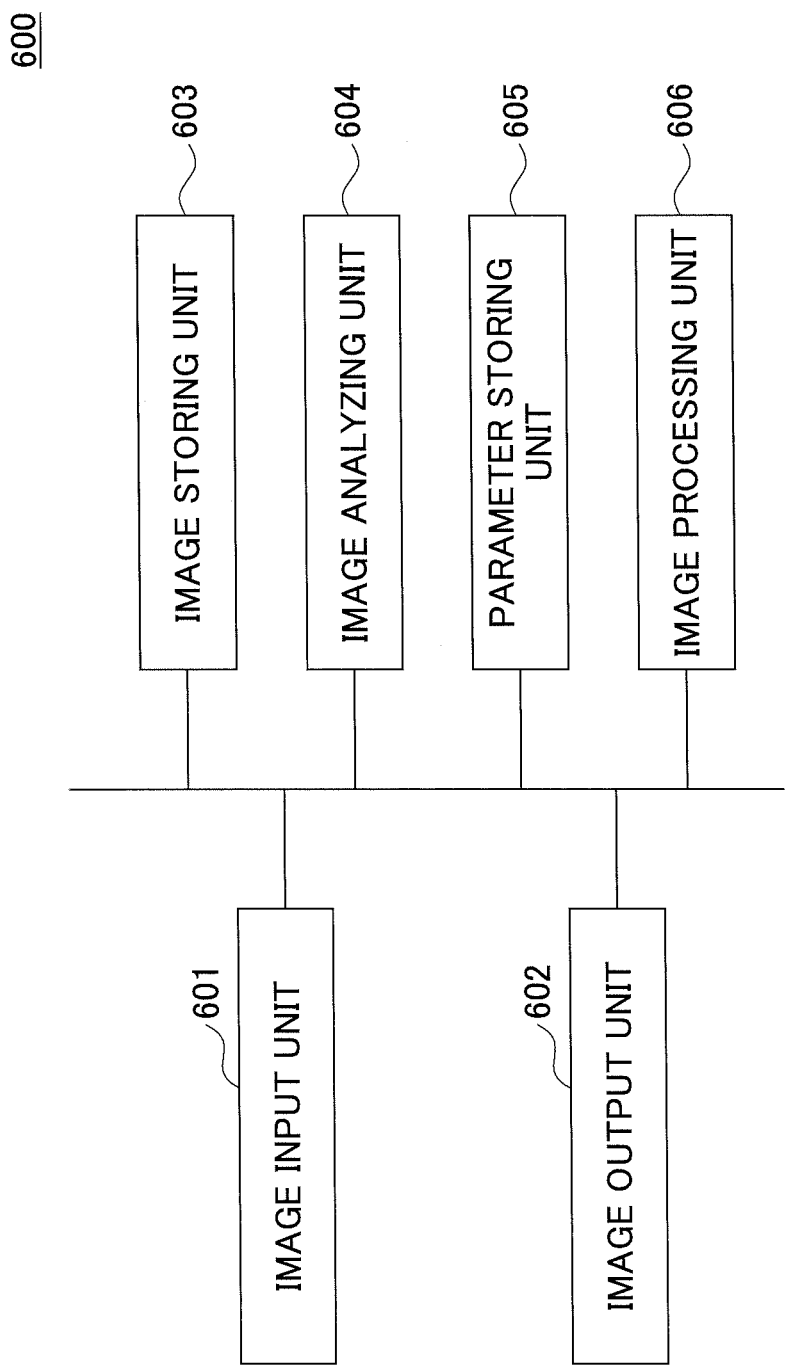
FIG. 7 is a block diagram showing an example of a structure of a color tone conversion system.

FIG. 7 is a block diagram showing an example of the structure of the color tone conversion system 600.

The color tone conversion system 600 includes an image input unit 601, an image output unit 602, an image storing unit 603, an image analyzing unit 604, a parameter storing unit 605 and an image processing unit 606.

The image input unit 601 corresponds to the scanner device 300 shown in FIG. 5, and inputs image data by reading a printed object or an output result.

The image storing unit 603 corresponds to the computer 100 shown in FIG. 5, and stores the image data input by the image input unit 601.

The image analyzing unit 604 corresponds to the computer 100 shown in FIG. 5, and analyzes the reference image data 80, the user image data 82 and the original image data 84 to generate the color tone conversion parameter.

The parameter storing unit 605 corresponds to the computer 100 shown in FIG. 5, and stores the color tone conversion parameter generated by the image analyzing unit 604 or previously obtained.

The image processing unit 606 corresponds to the computer 100 or the user printer 200 shown in FIG. 5, and performs the color tone conversion on image data based on the color tone conversion parameter.

The image output unit 602 corresponds to the user printer 200 shown in FIG. 5, and outputs (prints) the image data such as the original image data 84 or the converted original image data 85.

Figure 8:
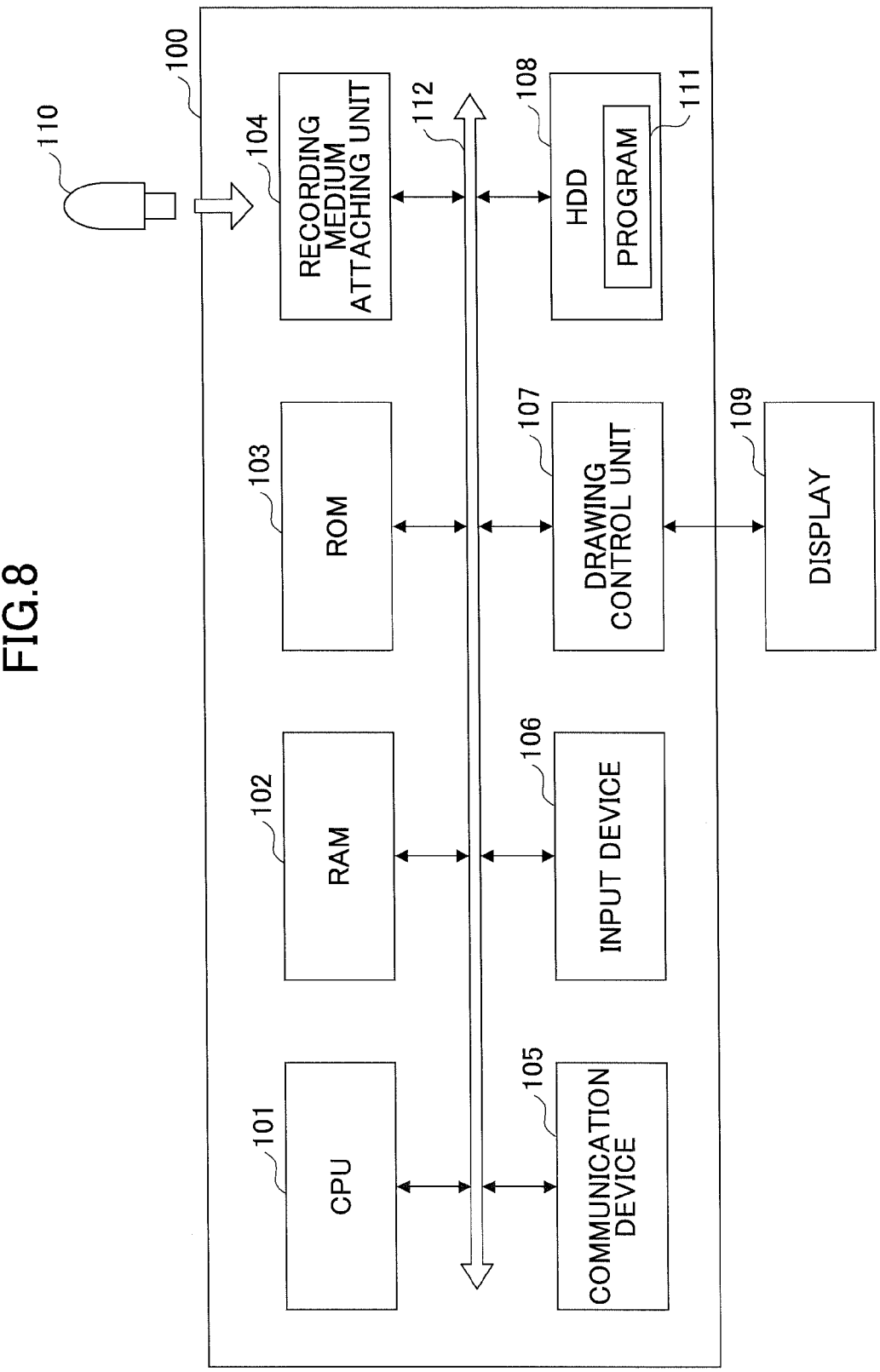
FIG. 8 is a block diagram showing an example of a hardware structure of a computer.

FIG. 8 is a block diagram showing an example of a hardware structure of the computer 100.

The computer 100 includes a CPU 101, a RAM 102, a ROM 103, a recording medium attaching unit 104, a communication device 105, an input device 106, a drawing control unit 107 and a Hard Disk Drive (HDD) 108 which are connected with each other via a bus 112. The CPU 101 provides various functions and generates the color tone conversion parameter by reading and executing an Operating System (OS) or programs from the HDD 108 or the like.

The RAM 102 is a working memory (main memory) that temporarily stores data necessary for the CPU 101 to execute the programs. The ROM 103 stores programs to start a Basic Input Output System (BIOS) of the OS, or static data.

A recording medium 110 is detachably attached to the recording medium attaching unit 104. When the recording medium 110 is attached to the recording medium attaching unit 104, the recording medium attaching unit 104 reads a program stored in the recording medium 110 and stores in the HDD 108. Further, the recording medium attaching unit 104 writes data stored in the HDD 108 on the recording medium 110. The recording medium 110 may be a USE memory, an SD card or the like.

The input device 106 may be a keyboard, a mouse, a trackball or the like, and accepts various operational instructions by a user to the computer 100.

The HDD 108 may be a non-volatile memory such as a Solid State Drive (SSD) or the like, and stores various data such as OS, programs, image data or the like. Further, the HDD 108 stores a program 111 for generating the color tone conversion parameter.

The communication device 105 may be a Network Interface Card (NIC) to be connected to the network 500 such as the INTERNET, and may be for example, an Ethernet (registered trademark) card.

The drawing control unit 107 generates an image panel to be displayed on a display 109 by interpreting a drawing command written in a graphic memory by the CPU 101 by executing the programs.

The computer 100, the user printer 200 and the scanner device 300 may be mounted on a single Multi Function Peripheral (MFP).

Figure 9:
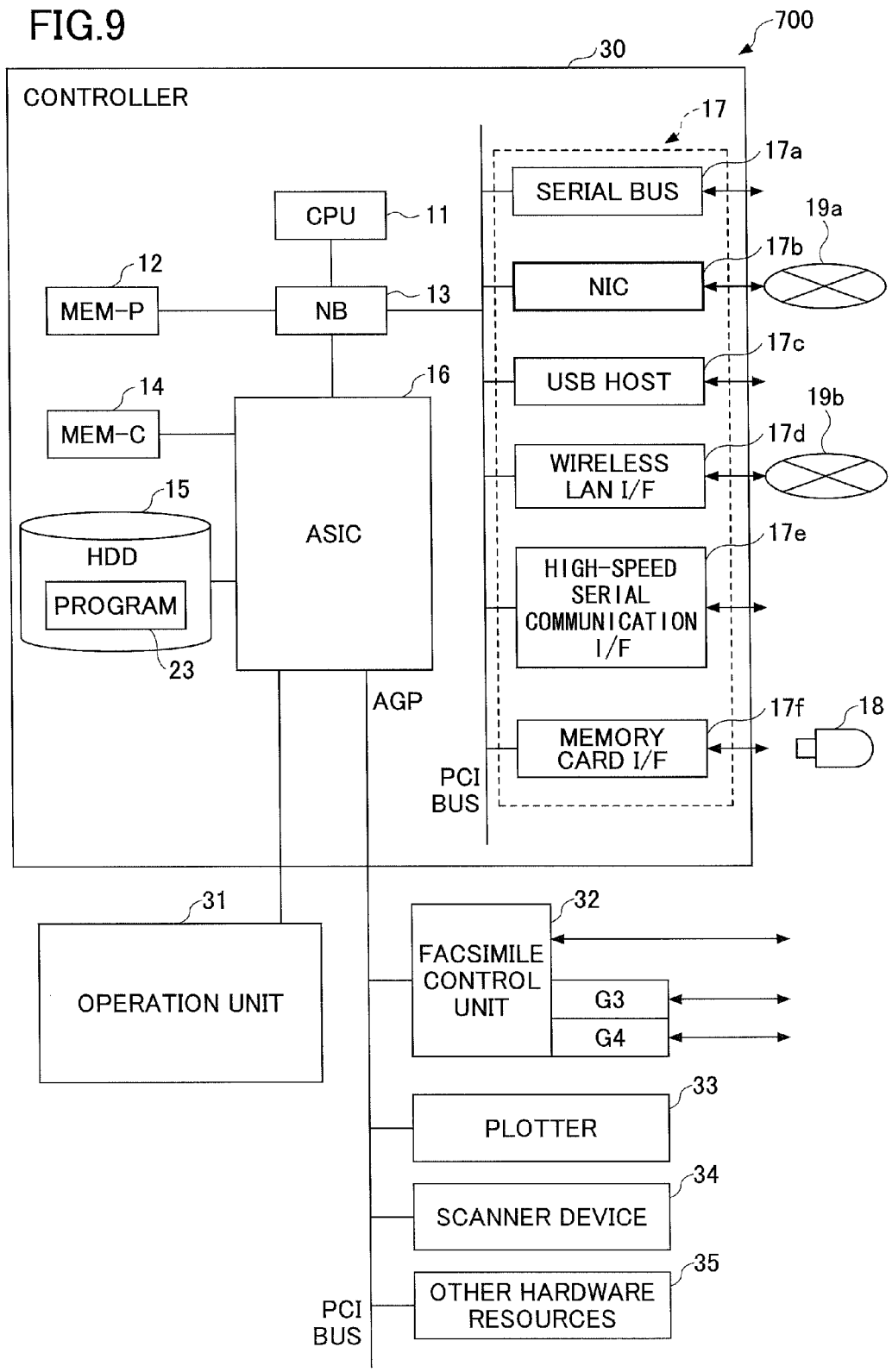
FIG. 9 is a block diagram showing an example of a hardware structure of a MFP.

FIG. 9 is a block diagram showing an example of a hardware structure of a MFP 700 where the color tone conversion system 600 is actualized by the MFP 700.

The MFP 700 includes a controller 30, an operation unit 31, a facsimile control unit 32, a plotter 33, a scanner device 34 and other hardware resources 35. The controller 30 includes a CPU 11, a MEM-P 12, a Northbridge (NB) 13, an application specific IC (ASIC) 16, a MEM-C 14, a HDD 15 and peripheral devices 17 which are connected to the NB 13 via a PCI bus.

In the Controller 30, the MEM-C 14, the HDD 15 and the NB 13 are connected to the ASIC 16 and the CPU 11 and the MEM-P 12 are connected to the NB 13. The NB 13 is one of a CPU chip set, and is a bridge for connecting the CPU 11, the MEM-P 12, the ASIC 16 and the peripheral devices 17.

The ASIC 16 is an IC for image processing and performs various kinds of image processing. The ASIC 16 also has a function of a bridge to connect the AGP, the HDD 15 and the MEM-C 14. The CPU 11 controls the entirety of the MFP 700 and initiates various applications installed in the MFP 700 to be executed.

The MEM-P 12 is a system memory used by a system of the MFP 700 and the MEM-C 14 is a local memory used as a buffer of image data on which image processing is being performed.

The HDD 15 is a mass storage and a SSD may be used as the HDD 15. The HDD 15 stores various data such as OS, programs including various application programs, font data or the like. Further, the HDD 15 stores a program 23 for generating the color tone conversion parameter.

The peripheral devices 17 includes a serial bus 17a, a Network Interface Card (NIC) 17b, a USB host 17c, a wireless LAN I/F 17d, a high-speed serial communication I/F 17e, a memory card I/F 17f and the like. A cable, Centronics for example, not shown in the drawings, is connected to the serial bus 17a. The NIC 17b controls communication via a network 19a. A device is connected to the USB host 17c via a USB cable (not shown in the drawings). The wireless LAN I/F 17d controls communication via wireless LAN 19b. The wireless LAN I/F 17d may be an interface in accordance with the standard of IEEE802.11a/b/g/n, for example. The high-speed serial communication interface 17e may be an interface in accordance with the standard of IEEE 1394, for example that controls high-speed serial communication. A memory card 18 of various kinds is attached to the memory card I/F 17f where data is written and read. The memory card 18 may be, for example, a SD card, a multi media card, an xD card or the like. The network 19a and the wireless LAN 19b may be included in the network 500 shown in FIG. 5.

The operation unit 31 may include hardware such as a keyboard and a display such as a liquid crystal display. The operation unit 31 receives an input operation from the user, and displays various display panels to the user. The operation unit 31 may include a touch panel and may receive an input operation from the user by soft-keys displayed on the touch panel.

The facsimile control unit 32 is connected to a public telecommunication network via a Network Control Unit (NCU), not shown in the drawings, and sends and receives facsimile data in accordance with a communications protocol corresponding to facsimile data such as G3 or G4. The facsimile control unit 32 sends image data as facsimile data by performing a signal processing such as data compression or modulation on the image data, and reconstitutes image data by performing a signal processing such as data extension or error correction on received facsimile data.

The plotter 33 may be, for example, a monochrome plotter or a color plotter using electrophotography. The plotter 33 forms an image of each of the pages of document data to be printed or image data read and formed by the scanner device 34 and transfers the formed image on a paper. For example, the plotter 33 may use a laser beam by electrophotography where a toner image formed on a photoconductor drum or the like is transferred to a paper, fixed by heat and pressure using a fixing device and output. Further, the image may be printed by using ink.

The scanner device 34 forms image data by optically scanning a document placed on a contact glass and performing a known image processing in which an A/D conversion is performed on the reflected light to obtain digital data of a predetermined resolution.

For the MFP 700 shown in FIG. 9, the scanner device 34 corresponds to the image input unit 601 shown in FIG. 7 and thus corresponds to the scanner device 300 shown in FIG. 5. The plotter 33 corresponds to the image output unit 602 shown in FIG. 7 and thus corresponds to the user printer 200 shown in FIG. 5. Further, the HDD 15 corresponds to the image storing unit 603, the CPU 11 corresponds to the image analyzing unit 604 and the parameter storing unit 605 and the ASIC 16 corresponds to the image processing unit 606.

Figure 10:
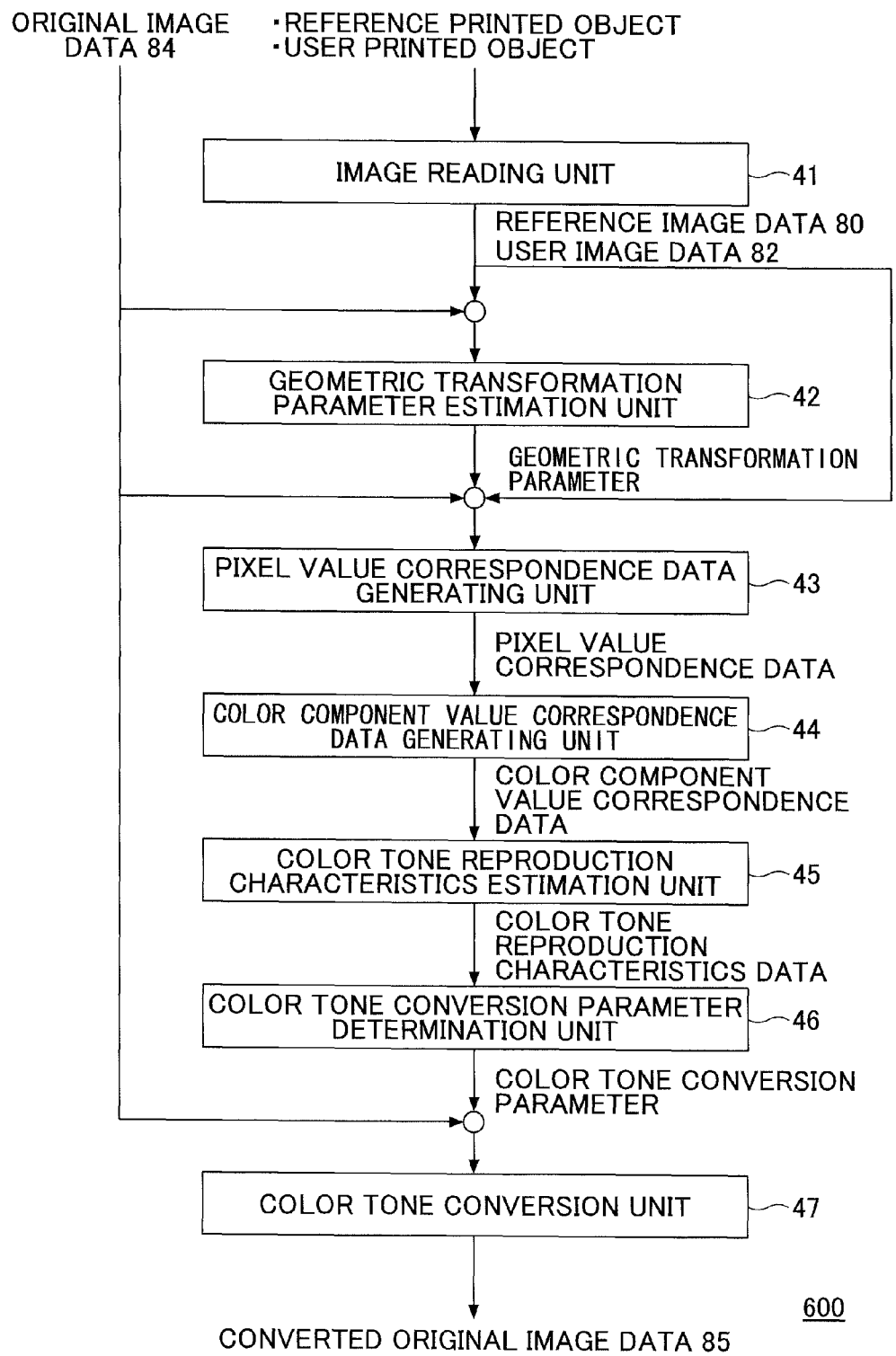
FIG. 10 is a block diagram showing an example of a functional structure of a color tone conversion system.

FIG. 10 is a block diagram showing an example of a functional structure of the color tone conversion system 600 (or the MFP 700).

The color tone conversion system 600 (or the MFP 700) includes an image reading unit 41, a geometric transformation parameter estimation unit 42, a pixel value correspondence data generating unit 43, a color component value correspondence data generating unit 44, a color tone reproduction characteristics estimation unit 45, a color tone conversion parameter determination unit 46 and a color tone conversion unit 47.

The image reading unit 41 reads the reference printed object and the user printed object, which are output results of the original image data 84 to generate the reference image data 80 and user image data 82, respectively.

The geometric transformation parameter estimation unit 42 estimates a first geometric transformation parameter between the original image data 84 and the reference image data 80, and a second geometric transformation parameter between the original image data and the user image data 82, respectively.

The pixel value correspondence data generating unit 43 detects a pixel of the reference image data 80 corresponding to each of the pixels of the original image data 84 using the first geometric transformation parameter, and generates first pixel value correspondence data in which the pixel values of the corresponding pixels of the reference image data 80 and the original image data 84 correspond with each other. Similarly, the pixel value correspondence data generating unit 43 detects a pixel of the user image data 82 corresponding to each of the pixels of the original image data 84 using the second geometric transformation parameter, and generates second pixel value correspondence data in which the pixel values of the corresponding pixels of the user image data 82 and the original image data 84 correspond with each other.

The color component value correspondence data generating unit 44 generates first color component value correspondence data in which the color component values of the corresponding pixels of the original image data 84 and the reference image data 80 correspond with each other based on the first pixel value correspondence data. Similarly, the color component value correspondence data generating unit 44 obtains second color component value correspondence data in which the color component values of the corresponding pixels of the original image data 84 and the user image data 82 correspond with each other based on the second pixel value correspondence data.

The color tone reproduction characteristics estimation unit 45 estimates color tone reproduction characteristics data using the first color component value correspondence data and the second color component value correspondence data.

The color tone conversion parameter determination unit 46 determines a color tone conversion parameter using the color tone reproduction characteristics data.

The color tone conversion unit 47 performs a color tone conversion on the original image data 84 using the color tone conversion parameter to generate the converted original image data 85.

(Operation)

FIG. 11 is a flowchart showing an example of processes in which the color tone conversion system 600 (or the MFP 700) estimates the color tone reproduction characteristics data. Although the processes for the reference image data 80 (reference printed object) and the user image data 82 (user printed object) are explained in parallel in the following, the processes may be separately performed in order.

The image reading unit 41 reads the reference printed object and the user printed object to form the reference image data 80 and the user image data 82, respectively (S101).

The geometric transformation parameter estimation unit 42 matches positions of the original image data 84 and the reference image data 80, and positions of the original image data 84 and the user image data 82 (S102).

Before matching the positions, the geometric transformation parameter estimation unit 42 generates the first geometric transformation parameter of the reference image data 80 with respect to the original image data 84 and the second geometric transformation parameter of the user image data 82 with respect to the original image data 84.

The geometric transformation parameter may be a displacement amount, a rotational angle or magnification, for example. The first and second geometric transformation parameters may be obtained by a known technique such as a pattern matching using markers, a pattern matching without using markers, Phase-Only Correlation or the like.

Each of the methods is explained in the following.

a) Pattern Matching Using Markers

For this example, one or more alignment markers are included in the original image data 84 and the reference image data 80 (or the user image data 82) at one or more corners or a center.

A method of obtaining the first geometric transformation parameter is explained with reference to FIGS. 12A and 12B. FIG. 12A is a view showing an example of alignment markers.

As shown in FIG. 12A, 6 alignment markers 84a and 82a are included in the original image data 84 and the user image data 82, respectively. It is assumed that the alignment markers 84a and 82a are provided at predetermined positions in each of the image data. It means that the reference printed object itself also includes the alignment markers.

In such a case, by comparing the positional differences between the corresponding alignment markers 84a and 82a in the original image data 84 and the user image data 82, the first geometric transformation parameter can be obtained. Specifically, the positions of the alignment markers 84a and 82a such as displacement amount, rotational angle, magnification or the like between the original image data 84 and the reference image data 80 can be obtained.

Here, the positions of the alignment markers 84a and 82a can be detected by searching the alignment markers 84a and 82a from an edge of each of the image data as the approximate positions of the alignment markers 84a and 82a are known.

FIG. 12B is a view showing an example of a positional shift of the alignment markers 84a and 82a. Here, "Pn" (where "n" is an integer greater than or equal to 1) expresses a position of a feature point of the alignment marker 84a of the original image data 84, and "qn" (where "n" is an integer greater than or equal to 1) expresses a position of a feature point of the alignment marker 82a of the user image data 82, respectively. By obtaining the positional shifts between the corresponding feature points, "P1" and "q1", "P2" and "q2", "P3" and "q3" . . . respectively, of the original image data 84 and the user image data 82, the first geometric transformation parameter can be obtained.

Here, it is known that the corresponding feature points can be matched with each other by performing an affine transformation for example to one of the image data. Thus, an optimal affine parameter that best approximates the corresponding feature points may be obtained as the first geometric transformation parameter. For example, an evaluation function of an affine parameter to perform the affine transformation to the user image data 82 such that the feature points "q1" to "q6" match the feature points "P1" to "P6" of the original image data 84, respectively, may be set, and the affine parameter for which the evaluation function becomes the minimum may be determined as the first geometric transformation parameter.

The second geometric transformation parameter can be obtained by the similar method.

b) Pattern Matching without Using Markers

For an example of a method of estimating only the displacement amount, template matching may be used. In the template matching, one of the image data is set as a template, and a matching position is detected where the coincidence between the image data becomes the highest by comparing the coincidence between the image data while gradually shifting the position of the template.

When the geometric transformation necessarily includes rotational angle, magnification or the like in addition to the displacement amount, a method of estimating the rotational angle such as a Hough transform or the like, or a method of estimating the magnification such as a multi-scale analysis or the like may be combined to be used.

Further, block matching, which is an application of the template matching, where one of the image data is divided into plural blocks, and a matching position is detected where the coincidence between each of the blocks and a corresponding block in the other image data becomes the highest to obtain the displacement amount for each of the blocks. In the block matching, the rotational angle or the magnification can be estimated based on the displacement amount of each of the blocks.

c) Phase-Only Correlation

For an example of a method of estimating the displacement amount, the rotational angle, and the magnification with a high accuracy, Phase-Only Correlation (POC) or rotation invariant Phase-Only Correlation (RIPOC) may be used. In the Phase-Only Correlation, phase image data are formed from the original image data by performing a discrete Fourier transform to the original image data, and a matching position is detected where the correlation between the prepared phase image data becomes the highest. In the rotation invariant Phase-Only Correlation, the phase image data are further transformed by a logarithm polar coordinate transform, and the rotational angle and the magnification can be detected as the displacement amount.

Referring back to FIG. 11, in step S102, when the first geometric transformation parameter and the second geometric transformation parameter are obtained, the geometric transformation parameter estimation unit 42 performs geometric transformation on the reference image data 80 and the user image data 82 using the first geometric transformation parameter and the second geometric transformation parameter, respectively. When performing the geometric transformation, if the pixels of the reference image data 80 (or the user image data 82) before and after the geometric transformation are not correspond with each other because of a change in sub-pixel precision, rotation, size variation or the like, pixel values may be calculated using interpolation such as a bilinear interpolation, bicubic interpolation or the like.

The geometric transformation is not necessarily performed. Instead, when obtaining the pixel values of the corresponding pixels of the original image data 84 and the reference image data 80 (or the user image data 82) in the following step, coordinate conversion may be performed using the first geometric transformation parameter and the second geometric transformation parameter and then the corresponding pixels may be determined. In other words, even when the coordinate values between two image data are different in respective coordinate systems in which an origin of each of the image data is set as a reference, the pixels having the same coordinate value between the image data after performing the coordinate conversion can be referred to as the corresponding pixels.

There may be a case where a printed object obtained by printing the original image data 84 includes a space at a peripheral. Even in such a case, height or width of the space may be included in the displacement amount in the geometric transformation and the space does not influence a matching position. However, the space may be previously removed so that the origins of two image data match.

Then, the pixel value correspondence data generating unit 43 corresponds the pixel values of the corresponding pixels of the original image data 84 and the reference image data 80 (or the user image data 82) (S103). It means that after the positions of the original image data 84 and the reference image data 80 (or the user image data 82) are matched, the first pixel value correspondence data and the second pixel value correspondence data are generated by obtaining the pixel values of the corresponding pixels of two image data, and storing them in correspondence with each other.

Here, when matching the positions of two image data by performing the geometric transformation on one of the image data, the "corresponding pixels" are "pixels at the same position". When not performing the geometric transformation, the "corresponding pixels" are pixels at the same coordinate value after performing the coordinate conversion.

For the method of storing the pixel values in correspondence with each other, a method of using lists or using matrix may be used. It is assumed that both of the original image data 84 and the reference image data 80 (or both of the original image data 84 and the user image data 82) are RGB images where each of the color components is expressed by 256 color tones.

a) Storing in Lists

The color component values are stored in lists as follows.

a-1) prepare three lists including a list for R component, a list for G component and a list for G component respectively corresponding to the three color components RGB, a-2) select a pixel of the original image data 84, a-3) add the R component value of the pixel of the original image data 84 selected in a-2, and the R component value of the corresponding pixel of the reference image data 80 (or the user image data 82) in correspondence with each other in the list for R component, a-4) similarly, add the G component values in the list for G component and the B component values in the list for B component, respectively, and a-5) repeat the above operations for all of the pixels in the original image data 84.

These lists may be sorted in ascending sort or descending sort in accordance with necessity.

b) Storing in Matrix

The correspondence between color component values is voted in the matrix as follows. Here, it is assumed that pixel values of the original image data 84 are expressed in axis of ordinates (expressed as rows), and pixel values of the reference image data 80 (or the user image data 82) are expressed in axis of abscissas (expressed as columns).

b-1) prepare three matrix including a matrix for R component, a matrix for G component and a matrix for G component respectively corresponding to the three color components RGB. Each of the matrix includes 256 rows and 256 columns where the rows express pixel values of the original image data 84 and the columns express pixel values of the reference image data 80 (or the user image data 82), b-2) select a pixel of the original image data 84, b-3) vote (add) a point to a position crossing a row of the pixel of the original image data 84 selected in a-2 and a column of the corresponding pixel of the reference image data 80 (or the user image data 82) the in the matrix for R, b-4) similarly, vote (add) the correspondence of the G component values in the matrix for G, and the correspondence of the B component values in the matrix for B, respectively, and b-5) repeat the above operations for all of the pixels in the original image data 84.

Specifically, when a pixel value of a pixel of the original image data 84 is (R, G, B)=(128, 130, 132), and a pixel value of a pixel of the reference image data 80 (or the user image data 82) corresponding to the pixel of the original image data 84 is (R, G, B)=(132, 130, 126), for the matrix for R, a point is added to the 128th row and the 132nd column. Similarly, for the matrix for G, a point is added to the 130th row and the 130th column and for the matrix for B, a point is added to the 132nd row and the 126th column. The values of the original image data 84 and the values of reference image data (or the user image data 82) may be allocated to one of the axis of ordinates and the axis of abscissas and the other of the axis of ordinates and the axis of abscissas, respectively.

For the method using lists or the method using the matrix, in order to simplify the operation, it is not necessary to use all of the pixels in the original image data 84, and pixels in a predetermined area, or pixels selected from the original image data 84 at a predetermined intervals may be used.

Then, the color component value correspondence data generating unit 44 corresponds the color component values of the corresponding pixels of the original image data and the reference image data 80 (or the user image data 82) (S104). It means that the color component value correspondence data generating unit 44 determines a color component value of the reference image data 80 (or the user image data 82) that corresponds to a selected color component value of the original image data 84 using the first (or second) pixel value correspondence data, and generates the first (or second) color component value correspondence data.

Similar to step S102, it is assumed that both of the original image data 84 and the reference image data 80 (or the user image data 82) are RGB images where each of the color components is expressed by 256 color tones.

a) When the Pixel Value Correspondence Data is the Lists

When the first (or second) pixel value correspondence data is stored as the lists, the following processes are performed.

a-1) select a color component value of one of the color components of a pixel of the original image data 84, a-2) obtain the list corresponding to the color component selected in a-1, a-3) obtain all of the records corresponding to the color component value of the original image data 84 selected in a-1 from the list obtained in a-2, a-4) synthesize the color component values of the reference image data 80 (or the user image data 82) of all of the records obtained in a-3, a-5) store the color component value of the original image data 84 selected in a-1 and the color component value synthesized in a-4 in correspondence with each other as the first (or second) color component value correspondence data, and a-6) repeat the above operations for all of the color component values of all of the color components.

When only one record is obtained in a-3, the color component value correspondence data generating unit 44 uses the value in the obtained record as the synthesized value. When plural records are obtained in a-3, the color component value correspondence data generating unit 44 calculates a single value such as an average value, mode or median based on the color component values of the reference image data 80 (or the user image data 82) of the plural records.

b) When the Pixel Value Correspondence Data is the Matrix

When the first (or second) pixel value correspondence data is stored as the matrix, the following processes are performed.

b-1) select a color component value of one of the color components of a pixel of the original image data 84, b-2) obtain the matrix corresponding to the color component selected in b-1, b-3) extract the row corresponding to the color component value selected in b-1 from the matrix obtained in b-2, b-4) synthesize the color component values of all of the columns corresponding to the row extracted in b-3, b-5) store the color component value of the original image data 84 selected in b-1 and the color component value synthesized in b-4 in correspondence with each other as the first (or second) color component value correspondence data, and b-6) repeat the above operations for all of the color component values of all of the color components.

When one or more votes exist in only one column in the row extracted in b-4, the color component value correspondence data generating unit 44 uses the color component values of the column as the synthesized value. When the votes exist in plural columns in the row extracted in b-4, the color component value correspondence data generating unit 44 calculates a single value such as an average value, mode or median. Here, when plural votes exist in the same column, the color component value of the column is used by multiplying the number of the votes.

When there exists a color component value which is not used in the original image data 84, that fact and the color component value may be discriminatively recorded, which will be used in the following step.

Then, the color tone reproduction characteristics estimation unit 45 estimates the first (or second) color tone reproduction characteristics (S105). The color tone reproduction characteristics estimation unit 45 estimates the first (or second) color tone reproduction characteristics using the first (or second) color component value correspondence data. The first (or second) color component value correspondence data may be used as the first (or second) color tone reproduction characteristics, or the first (or second) color component value correspondence data may be used after being data processed. By data processing, the drastic change in values can be reduced, the stability of the characteristic curve can be improved, or the like.

A method of data processing the first (or second) color component value correspondence data is explained in the following.

a) Multiplying Moving Average

In this method, a weighted average of a selected value and values before and after the selected values is obtained. The range of the values before and after used in the weighted average may be determined in accordance with the necessity for smoothness. In order to smooth the values, the range may be set larger. The weighted values used in obtaining the weighted average may be constant for all of the values, or may be altered based on the distance from the selected value.

Before multiplying moving average, the values in the first (or second) color component value correspondence data are sorted in an ascending order or a descending order based on the color component values of the original image data 84. Further, when there exists a color component value which is not used in the original image data 84, this value is deleted from the sorted data and is necessarily removed when obtaining the weighted average. Whether the value is deleted can be determined based on whether the values are continuous or the information recorded in the previous step.

b) Line-Fitting Approximation or Curve-Fitting Approximation

In this method, the values in the first (or second) color component value correspondence data are approximated by a linear function, a quadric function, a spline function, an exponential function or the like.

c) Reducing the Number of Color Tones and Approximating or Interpolation by a Line or Curve is Performed In this method, the number of color tones in the first (or second) color component value correspondence data is reduced as follows.

A) The color tones are equally divided into plural groups, and the color tones included in the same group is synthesized The number of division or the width of division may be previously determined or may be dynamically determined.

Figure 13A:
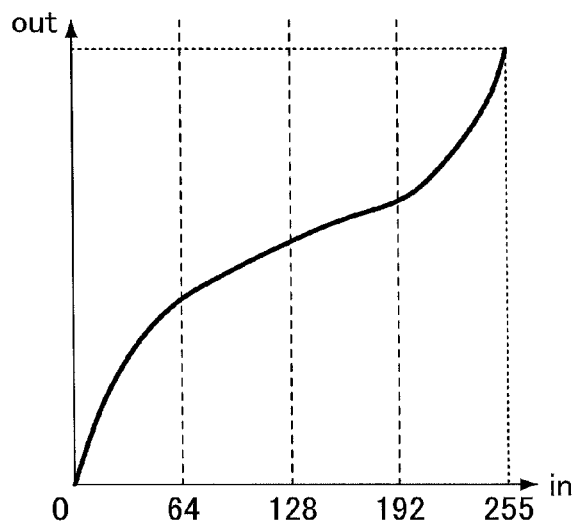
FIG. 13A to FIG. 13C are views showing an example of dividing color tones into plural groups.

A-1) A Case where the Number of Division or the Width of Division is Previously Determined FIG. 13A is a view showing an example of a case where the number of division or the width of division is previously determined. For the case shown in FIG. 13A, the color tones of 256, from 0 to 255, are divided into the predetermined number of division "4". Thus, the color tones are divided into four areas of 0 to 63, 64 to 127, 128 to 191 and 192 to 255, so that the color tones of 64 is reduced to be a single color tone (to a single color tone reproduction characteristic). The color tones may be divided by the width of division instead of the number of division.

A-2) A Case where the Number of Division or the Width of Division is Dynamically Determined The number of division or the width of division for equally dividing the color tones may be dynamically determined based on the number of pixels. For example, the number of division or the width of division may be obtained by dividing the number of pixels by an empirically obtained predetermined value.

B-1) A case where the color tones are divided by uneven intervals, and color tones included in the same group is synthesized Using the number of votes for each of the color tones in the first (or second) pixel value correspondence data, the width of division is appropriately determined such that the number of votes in each of the groups becomes the same.

Figure 13B:
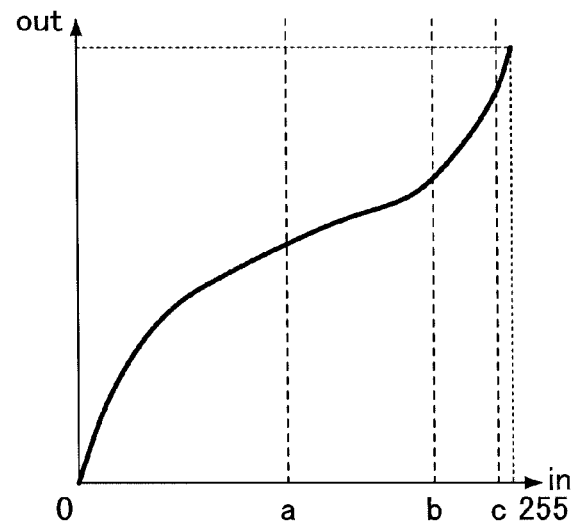

FIG. 13B is a view showing an example of a case where the color tones of 256, from 0 to 255, are divided into "4" with uneven intervals. The color tones are divided into four areas of 0 to (a-1), a to (b-1), b to (c-1) and c to 255, so that each of the areas is reduced to be a single color tone (to a single color tone reproduction characteristic). The color tones a, b and c may be included in either of the areas interposing the corresponding color tone.

When dividing the color tones with uneven intervals, a method of determining the number of color tones may be equally dividing the cumulative frequency of pixels included in each of the color tones, or using a frequency chart of the frequency of the pixels included in each of the color tones.

(i) Method of Equally Dividing the Cumulative Frequency of Pixels Included in Each of the Color Tones In this method, the cumulative frequency of pixels included in each of the color tones is equally divided and the color tones are divided by thus divided cumulative frequency.

Figure 13C:
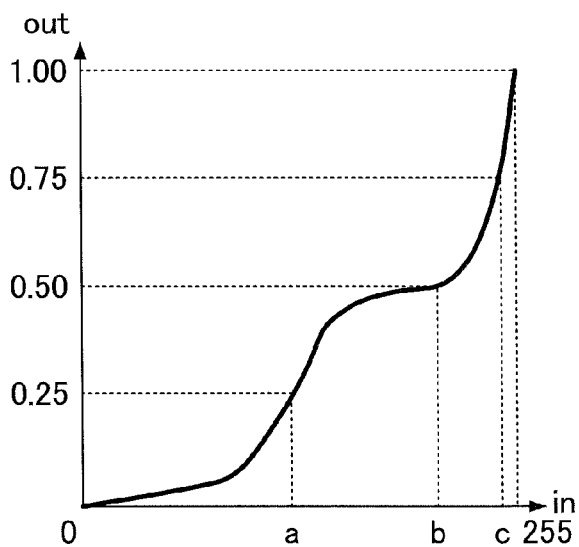

FIG. 13C is a view showing an example of a case where the color tones of 256, from 0 to 255, are divided into "4" with uneven intervals. In this graph, axis of abscissas express color tones and axis of ordinates express cumulative frequency where the maximum value of the cumulative frequency is determined as 1.0. In this case, the cumulative frequency is divided by 0.25, 0.50 and 0.75. Then, the color tones are divided by the color tones corresponding to the cumulative frequency of 0.25, 0.50 and 0.75, respectively. In this example, a color tone "a" where the value of the cumulative frequency becomes 0.25, a color tone "b" where the value of the cumulative frequency becomes 0.50, and a color tone "c" where the value of the cumulative frequency becomes 0.75 are determined and the above described four areas are determined. With this method, the number of data becomes the same in each of the groups so that the number of pixels included in each of the groups of pixel values can be determined to be equal.

Figure 14A:
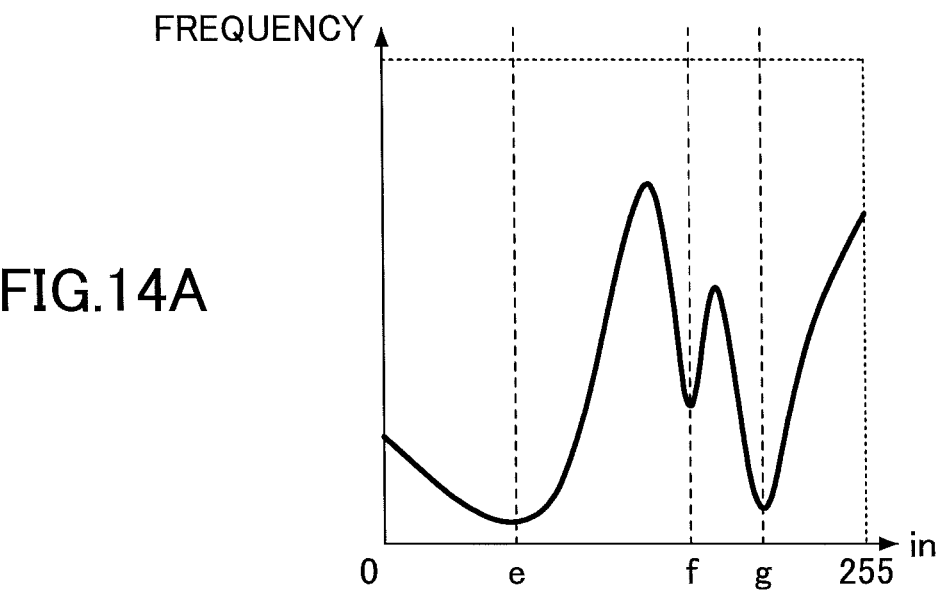
FIG. 14A and FIG. 14B are views showing an example of dividing color tones into plural groups.

(ii) Method Using a Frequency Chart of the Frequency of the Pixels Included in Each of the Color Tones FIG. 14A is a view showing a method of dividing the color tones into plural groups. In this graph, axis of abscissas express color tones and axis of ordinates express frequency of pixels. In other words, the frequency chart expresses the number of pixels belonging to each of the color tones. In this case, the color tones are divided at the color tones "e", "f" and "g" at which the frequency becomes the minimal. With this method, as the number of pixels existing at the interface between two different color tones can be reduced, the number of pixels for which the converting characteristic is changed can be reduced.

After reducing the number of color tones as described above, the image data is further processed to increase the number of color tones to the original number by interpolating the color tones between the synthesized color tones, or approximating by a straight line or a curved line based on the synthesized color tones.

Figure 14B:
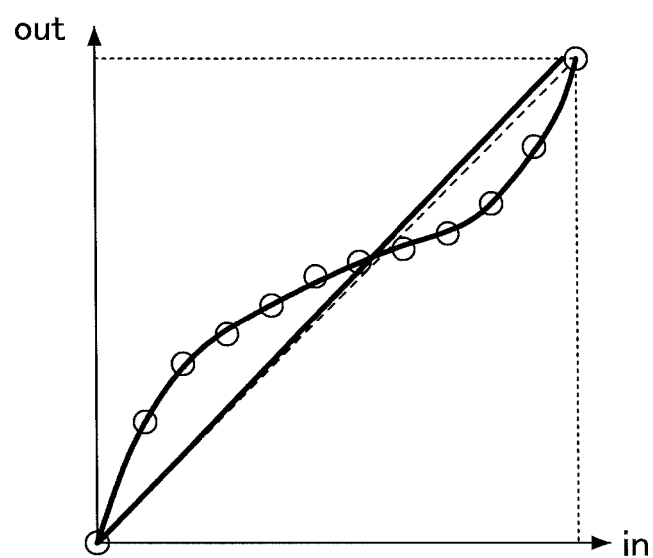

FIG. 14B is a view showing an example of increasing the number of color tones to the original number by line-fitting approximation or curve-fitting approximation. In FIG. 14B, circles express the synthesized color tones and solid lines express the line-fitting approximation or curve-fitting approximation. The functions used for the approximation may be selected based on the synthesized color tones. By increasing the number of color tones by interpolation, line-fitting approximation or curve-fitting approximation, the color tone conversion parameter can be appropriately determined without being influenced by a small number of the pixels having specific values.

Then, determination of the color tone conversion parameter is explained.

Figure 15:
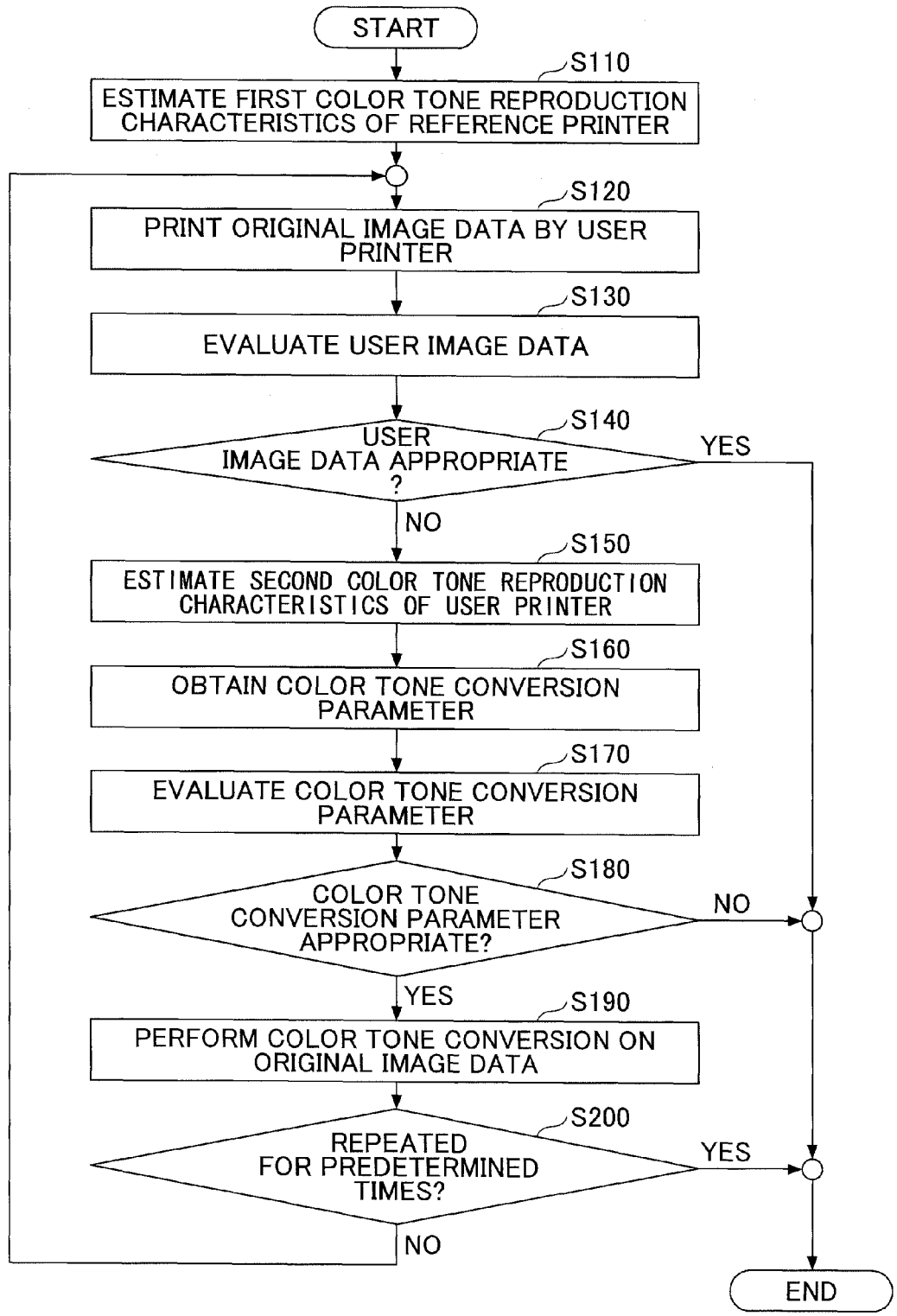
FIG. 15 is a flowchart showing an example of processes in which a color tone conversion system generates a color tone conversion parameter.

FIG. 15 is a flowchart showing an example of processes in which the color tone conversion system 600 (or the MFP 700) generates the color tone conversion parameter.

First, "estimate first color tone reproduction characteristics of reference printer" of step S110 and "estimate second color tone reproduction characteristics of user printer" of S150 are explained with reference to FIG. 11. It is enough to perform the processes of steps S110 and S150 once. If these processes are performed for plural times, the original image data 84, not the converted original image data 85, may be used at any time.

Then, the user has the user printer 200 print the original image data 84 (S120). By printing the original image data 84 using the user printer 200, the user printed object is obtained. Then, the user has the scanner device 34 or 300 (which will be referred simply as the scanner device 300) read the user printed object.

Then, the user printed object is evaluated (S130). The color tone conversion parameter determination unit 46 may evaluate the user printed object. Then, by comparing the user printed object (or user image data 82) and the reference printed object (or reference image data 80), the quality of the user printed object (or user image data 82) is evaluated (S140).

When the quality of the user printed object is appropriate in step S140 (YES in S140), the process is finished. However, if the quality of the user printed object is not appropriate in step S140 (NO in S140), the process proceeds to step S150.

An example of a method of evaluating the quality of the user printed object, color difference between the user printed object and the reference printed object may be used. Alternatively, hue difference or absolute values of the color difference may be used for evaluating the quality of the user printed object. Further, the quality of the user printed object may be evaluated by human view.

a) Evaluation Using Color Difference

Here, the color difference means a difference between two colors in L*a*b* color space or L*u*v* color space. In this example, as the image output apparatus is exemplified as the printer, an example where the color difference in L*a*b* color space is explained.

The color difference $\Delta E^*_{ab}$ in L*a*b* color space is defined by the following equation 1.

$$\Delta E^*_{ab} = \sqrt{(\Delta L^*)^2 + (\Delta a^*)^2 + (\Delta b^*)^2} \quad \text{[Equation 1]}$$

Here, $\Delta L^*$, $\Delta a^*$ and $\Delta b^*$ express differences in chromaticity between two colors in L*a*b* color space.

An example of obtaining the color difference of a pixel between the reference printed object and the user printed object is explained in the following.
(1) obtain the reference image data 80 by reading the reference printed object by the scanner device 300,
(2) obtain the user image data 82 by reading the user printed object by the scanner device 300 which is the same as that used in (1),
(3) convert the reference image data 80 and the user image data 82 to be expressed by a device-independent color space (XYZ color space or the like) using a color profile of the scanner device 300,
(4) further convert the reference image data 80 and the user image data 82 expressed by the device-independent color space to be expressed by L*a*b* color space, and
(5) obtain the color difference for each of the pixels based on the above equation.

Here, although it is described that the reference printed object and the user printed object are read by the same scanner device 300, the two printed objects may be read by different scanner devices. In such a case when the two printed objects are read by the different scanner devices, read image data are converted to be expressed by a device-independent color space using color profiles of each of the scanner devices.

It is not necessary to convert the read image data to be expressed by a device-independent color space using a color profile when only the single scanner device 300 is used. For a case when quantitatively evaluating the values of color difference, the absolute values are important so that it is necessary to convert the pixel values to be expressed by a device-independent color space. However, for a case when qualitatively evaluating the values of color difference, only relative tendencies are necessary so that it is unnecessary to convert the pixel values to be expressed by a device-independent color space.

When the color difference for each of the corresponding pixels is obtained, the color difference can be statistically analyzed so that the quality of the user printed object can be quantitatively evaluated. An example of analyzing the color difference may be an average value, a maximum value, distribution of values, variance or the like, of the color differences.

Whether the quality of the user printed object is enough can be determined based on, for example, whether the average value of the color difference is within a predetermined value (or range), whether the maximum value of the color difference is within a predetermined value (or range), whether the variance of the color difference is within a predetermined value (or range), or the like.

Further, when the quality of the user printed object is evaluated, outlines of contents included in the image data may be removed. The reason for removing the outlines is that there is a possibility that large color differences are generated at outlines because it is difficult to accurately match the positions of the outlines, or the reproduction characteristics (color tone, sharpness or the like) of the outlines are largely different based on printers.

As the dimension of the outlines is very small in the printed object, the outlines are not an influence on the evaluation of total color tone of the image when evaluated by human view. However, when quantitative evaluation is performed, the large color difference of the outlines becomes outliers to lower the reliability of the evaluation so that it is better to remove the outlines.

Examples of methods of detecting outlines may include a method using binarization or a method using edge detection. For the method using binarization, the image data is binarized by a predetermined threshold value into monochrome, and a position where a white area and a black area are adjacent to each other is determined as the outline. For the method using edge detection, edge image data is generated from the image data using a Sobel filter or the like, the edge image data is binarized by a predetermined threshold value into monochrome, and the pixel which has a pixel value larger than a predetermined threshold value is determined as the outline.

Instead of removing outlines, the following method will be performed in order to maintain the reliability of the evaluation result. For example, the image data may be smoothed to smooth the outlines as well to reduce the color difference which may be generated at the outlines. For smoothing, a known technique such as an average filter or a low-pass filter may be used.

b) Evaluation Using Hue Difference

The hue difference $\Delta H^*_{ab}$ in the L*a*b* color space is defined by the following equation 2.

$$\Delta H^*_{ab} = \sqrt{(\Delta E^*_{ab})^2 - (\Delta L^*)^2 - (\Delta C^*_{ab})^2} \quad \text{[Equation 2]}$$

Here, $\Delta E^*_{ab}$ expresses a color difference, $\Delta L^*$ expresses a difference in chromaticity between two colors, and $\Delta C^*_{ab}$ expresses a difference in chroma. The chroma ab can be expressed by the following equation 3.

$$C^*_{ab} = \sqrt{(a^*)^2 + (b^*)^2} \quad \text{[Equation 3]}$$

The method of obtaining the hue difference between the reference printed object and the user printed object is similar to the method of obtaining the color difference but the hue difference is calculated instead of calculating the color difference. The hue difference can also be statistically analyzed or the quality of the user printed object can also be determined similarly to that of the color difference.

c) Evaluation Using Absolute Values of Color Difference

For this method, the evaluation is performed by obtaining absolute values of color difference of a predetermined color space between the reference printed object and the user printed object. For an example when the predetermined color space is RGB color space, the absolute value of the color difference of an R component, the absolute value of the color difference of a G component, and the absolute value of the color difference of a B component are used.

An example where the absolute value of the color difference for each of the color components of the reference printed object and the user printed object are obtained is explained in the following.
(1) the reference image data 80 is obtained by reading the reference printed object by the scanner device 300,
(2) the user image data 82 is obtained by reading the user printed object by the scanner device 300, which is the same as that used in (1),
(3) the reference image data 80 and the user image data 82 are converted into image data expressed by a device-independent color space (XYZ color space or the like) using a color profile of the scanner device 300, and (4) the absolute value of a color difference in each of the color components in the converted color space is obtained for each of the pixels.

Similar to the case of evaluating using the color difference, the method of converting the image data into the image data expressed by the device-independent color space using the color profile of the scanner device 300 may be omitted. In such a case, the absolute value may be obtained using the pixel values of the device dependent color space obtained by the scanner device 300. Further, this method can also be statistically analyzed or the quality of the user printed object can also be determined similarly to that of the color difference.

As described above, the estimation of the second color tone reproduction characteristics of the user printer 200 in the next step S150 is already explained with reference to FIG. 11.

Then, the color tone conversion parameter determination unit 46 obtains the color tone conversion parameter (S160). It means that the first color tone reproduction characteristics of the reference printer 400 and the second color tone reproduction characteristics of the user printer 200 are combined to obtain the color tone conversion parameter. An example of obtaining the color tone conversion parameter is explained in the following.

(1) select a color component value "a" of one of the color components of the original image data 84,
(2) obtain a color component value "s" of the reference image data 80 corresponding to the color component value "a" from the first color tone reproduction characteristics of the reference printer 400,
(3) obtain a color component value "b" of the original image data 84 corresponding to the color component value "s" of the reference image data 80 from the second color tone reproduction characteristics of the user printer 200,
(4) store the combination of two values (a, b) in correspondence with each other,
(5) repeat the above operations for all of the color component values of the original image data 84 of all of the color components.

Then, the color tone conversion parameter can be obtained by directly using the above obtained corresponded values, or by using the corresponded values after being processed.

a) Case where the Above Corresponded Values are Directly Used

The above corresponded values are used as a look-up table (LUT), and the table is used as the color tone conversion parameter.

b) Case where the Above Corresponded Values are Used after being Processed

The above corresponded values may be used after being processed by moving average, line-fitting approximation or curve-fitting approximation, reduction of the number of color tones or the like which are already explained above for estimating the first (or second) color tone reproduction characteristics. In this case, the processed result is used as a look-up table (LUT), and the table is used as the color tone conversion parameter similar to that explained in (a). Further, for a case of the line-fitting approximation or the curve-fitting approximation, the coefficient of the function expression may be used as the color tone conversion parameter. Further, similar to the curve-fitting approximation, when the gamma correction is used as the color tone conversion, the gamma-value may be obtained based on the corresponded values, and the gamma-value may be used as the color tone conversion parameter.

The color tone conversion parameter determination unit 46 evaluates the color tone conversion parameter and determines whether it is appropriate (S170, S180).

When it is determined that the color tone conversion parameter is not appropriate (NO in S180), the process is finished.

When it is determined that the color tone conversion parameter is appropriate (YES in S180), the next process is performed.

The color tone conversion parameter determination unit 46 determines whether the generated color tone conversion parameter is appropriate based on at least one of whether the color tone conversion parameter is within a predetermined range, and whether the difference in pixel values of image data before and after being converted by the color tone conversion parameter meets the predetermined standard.

Whether the difference in pixel values of image data before and after being converted by the color tone conversion parameter meets the predetermined standard may be determined based on how the values of the converted image data are apart from a parameter expressing the values of input and output by the color tone conversion becomes the same.

An example of an evaluation value may be, when it is assumed that the color tone conversion is expressed by a graph,
a) an accumulation of an absolute value of a difference between an input value and an output value of each of the pixels,
b) an accumulation of a square of a difference between an input value and an output value of each of the pixels,
c) a maximum value of an absolute value of a difference between an input value and an output value of each of the pixels,
d) a maximum value of an absolute value of the inclination of the graph, or the like.

It can be determined that the color tone conversion parameter is appropriate when the evaluation value is within a predetermined range.

The determination of whether the color tone conversion parameter is appropriate is determining whether it is meaningful to perform the color tone conversion by the color tone conversion parameter and may be a determination of convergence of the color tone conversion. Thus, the process of step S180 may be omitted in accordance with necessity.

An example where it is meaningless to perform the color tone conversion by the color tone conversion parameter is as follows.

Figure 16A:
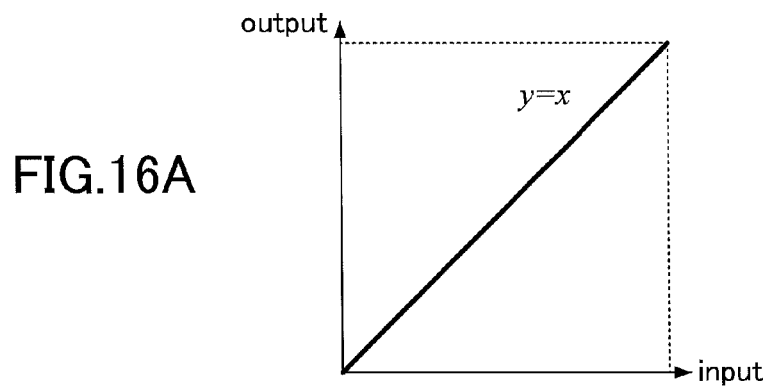
FIG. 16A to FIG. 16D are views showing an example of a color tone conversion parameter.

(a) Case where the Image Data does not Change Before and after the Color Tone Conversion FIG. 16A is a view showing an example of the color tone conversion parameter by which the image data does not change before and after the color tone conversion. In FIG. 16A, the color tone conversion parameter is shown as a graph, which is substantially equal to a line of y=x where an input value is substantially equal to an output value. For this case, if the color tone conversion is gamma correction, a gamma-value becomes almost 1.0. In such a case, it is meaningless to perform the color tone conversion.

Figure 16B:
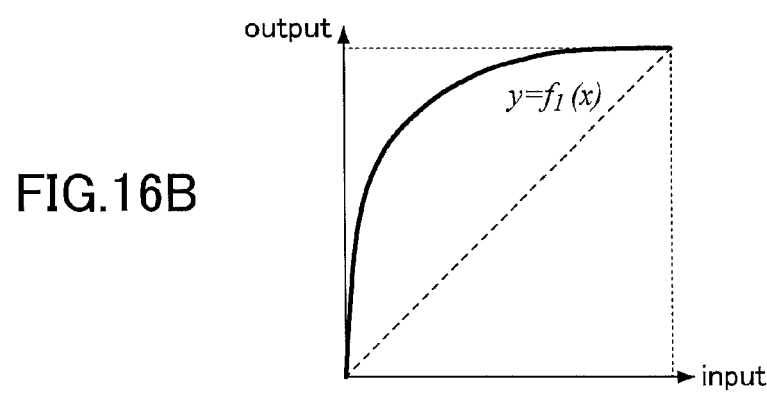
Figure 16C:
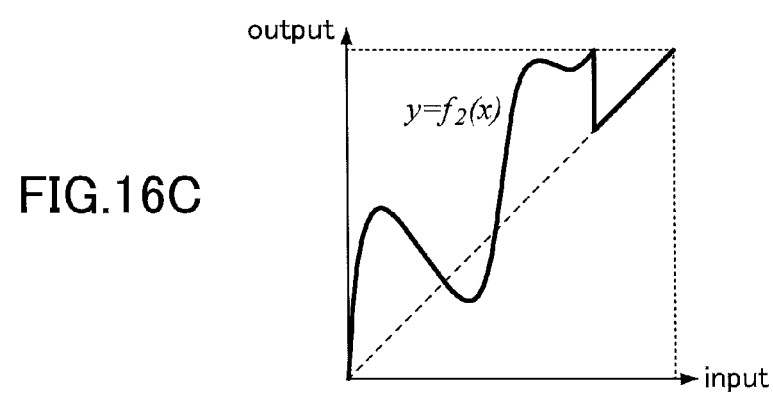
Figure 16D:
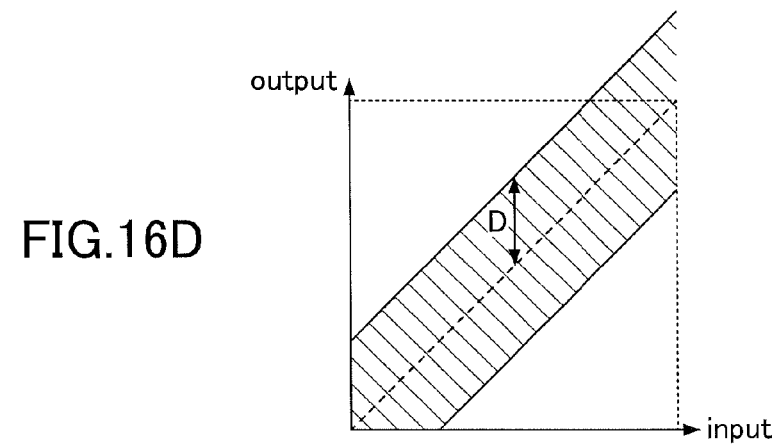

(b) Case where the Image Data Drastically Changes Before and after the Color Tone Conversion FIG. 16C and FIG. 16D are views showing an example of the color tone conversion parameters by which the image data drastically changes before and after the color tone conversion.

In FIG. 16B, the color tone conversion parameter is shown as a graph, which is largely apart from the line of y=x where an input value is substantially equal to an output value. In such a case, the color tones of the user printed object are largely changed by the color tone conversion and it is not preferable to perform the color tone conversion.

In FIG. 16C, the color tone conversion parameter is shown as a graph, which is drastically waved or drastically changes (not smoothly) with respect to the line of y=x where an input value is substantially equal to an output value. In such a case, the color tones of the user printed object are unevenly changed by the color tone conversion and it is not preferable to perform the color tone conversion. For the former case, if the color tone conversion is gamma correction, a gamma-value becomes close to zero or far greater than 1.

Here, basically, the case shown in FIG. 16C where one output value is corresponded with plural input values, or discontinuous points are included is not preferably used, however, this kind of color tone conversion parameter may be used depending on degree.

Whether the color tone conversion parameter is within a predetermined range is determined as follows.

When the color tone conversion parameter is within a predetermined range with respect to y=x as shown in FIG. 16D, it can be determined that the image data does not drastically change before and after the color tone conversion. In this case, whether the corresponding output value is within ±d % (or within the distance D) of the input value for each of the input values of the color tone conversion parameter.

Referring back to FIG. 15, when it is determined that the color tone conversion parameter is appropriate in step S180 (YES in S180), the color tone conversion unit 47 performs the color tone conversion on the original image data 84 (S190). In other words, the color tone conversion unit 47 updates the original image data 84 by performing the color tone conversion using the color tone conversion parameter to generate the converted original image data 85.

With the above operation, the process is finished. The color tone conversion may be performed by the gamma correction or the method using the look-up table (LUT).

The color tone conversion may be repeated for a predetermined times. Thus, when the color tone conversion is repeated for the predetermined times (YES in S200), the process is finished. It is considered that a single performance of the color tone conversion is enough, however, by repeating the color tone conversion for plural times, the reproduction characteristics may be further improved.

When it is determined to continue the color tone conversion in step S200 (NO in S200), the converted original image data 85 which is performed with the color tone conversion in step S190 is used as the original image data in step S120 to be printed by the user printer 200, and the same processes are performed.

When repeating the same processes, for steps S120 to S140, the converted original image data 85 is used as the original image data. As described above, it is not necessary to perform the process of step S150 (and steps S160 to S180). However, if the process of these steps are performed, the original image data 84, not the converted original image data 85, may be used in steps S150 and S160. In step S170, any of the original image data 84 or the converted original image data 85 may be used.

Further, in step S190, there may be the following cases.
(a) the current color tone conversion is performed on the converted original image data 85, or
(b) the current and the previous color tone conversions are performed on the original image data 85 in a combined manner.

Although for the process shown in FIG. 15, there are three steps S140, S180 and S200 in which it is determined whether to finish the process, it is not necessary to include all of these three steps, however, one of the steps may be included.

In this embodiment, although an example where the color space, which is used when reading the printed object by the scanner device 300, is used is described, the color space is a device dependent color space. Thus, the color space of the image data may be converted to a device-independent color space by using a color profile of the scanner device 300. The device-independent color space may be device-independent RGB color space, XYZ color space or the like. Further, the color space of the image data may be converted to a uniform color space such as $L^*a^*b^*$ color space or the like.

When the image data obtained by the scanner device 300 are expressed by the $L^*a^*b^*$ color space, it is necessary to convert the original image data to be expressed by the $L^*a^*b^*$ color space. Further, the estimation of the color tone reproduction characteristics, the determination of the color tone conversion parameter, and the color tone conversion are performed in the $L^*a^*b^*$ color space. Then, after the color tone conversion is performed, the image data is further converted to the original color space.

Further, as shown in FIG. 5, it is described that the reference printer 400, the user printer 200, and the scanner device 300 are exemplified as the reference image output apparatus A, the user image output apparatus B and the image reading apparatus C, respectively. Alternatively, the reference image output apparatus A, the user image output apparatus B and the image reading apparatus C may be other embodiments.

Figure 17:
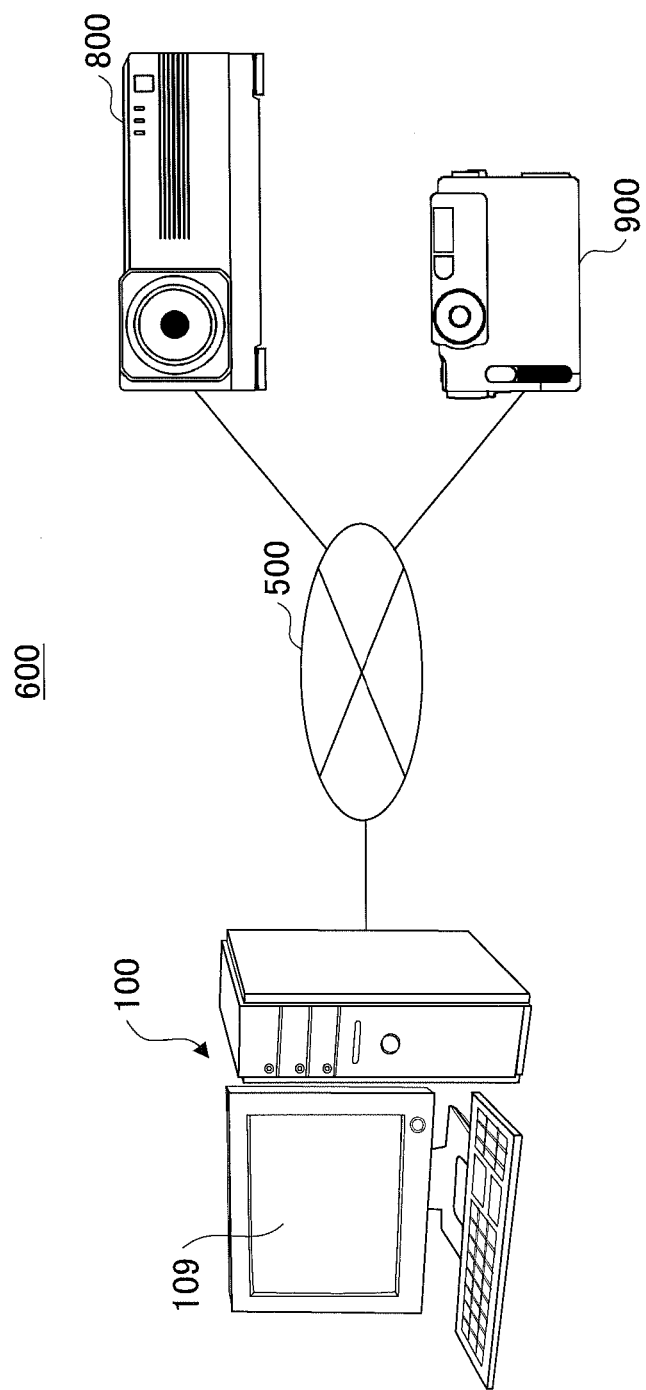
FIG. 17 is a block diagram showing another example of a structure of a color tone conversion system.

FIG. 17 is a block diagram showing another example of a structure of the color tone conversion system 600. The color tone conversion system 600 includes the computer 100, a projector 800 and a digital camera 900 which are connected via the network 500.

The difference between the structure shown in FIG. 17 and that shown in FIG. 5 is as follows.
a) a display 109, which corresponds to the reference printer 400, is provided to be connected to the computer 100,
b) a displayed image displayed on the display 109, which will be referred to as a reference displayed image, corresponds to the reference printed object,
c) the projector 800 corresponds to the user printer 200,
d) a projected image projected by the projector 800, which will be referred to as a user displayed image, corresponds to the user printed object, and
e) the digital camera 900 corresponds to the scanner device 300.

In such a system, the color tone conversion parameter can be generated according to the similar method as explained above.

(Converting Degree Parameter)

Figure 18:
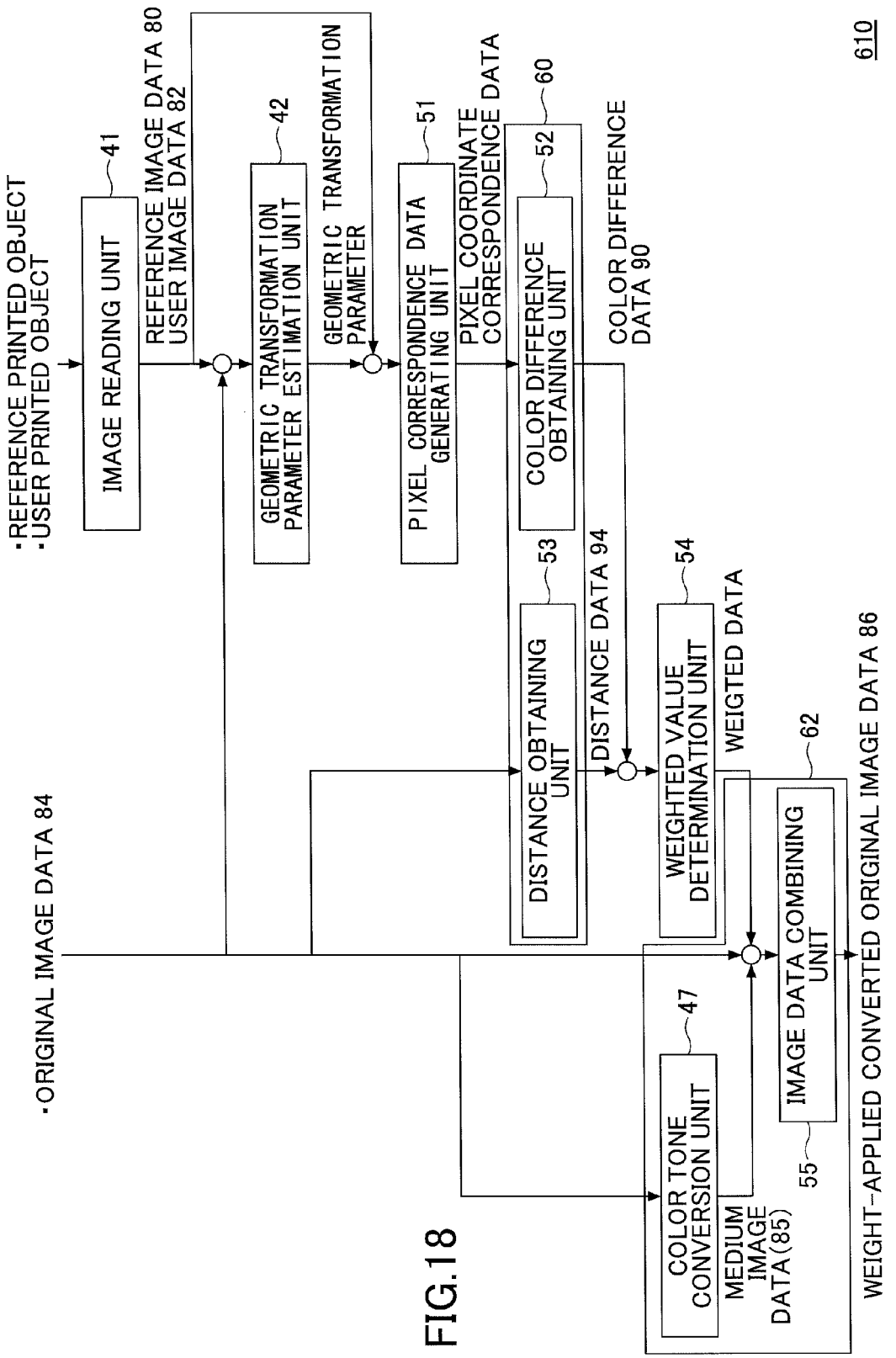
FIG. 18 is a block diagram showing an example of a functional structure of a color tone conversion system.

FIG. 18 is a block diagram showing an example of a functional structure of a color tone conversion system 610. The color tone conversion system 610 may be actualized by the combination of the user printer 200, the scanner device 300 and the computer 100 as shown in FIG. 5, or may be actualized by the MFP 700 as shown in FIG. 9.

The color tone conversion system 610 is different from the color tone conversion system 600 shown in FIG. 10 that the color tone conversion is performed on the original image data 84 using the color tone conversion parameter while applying the weighted values for each of the predetermined range to obtain weight-applied converted original image data 86 as explained above with reference to FIG. 1 and FIG. 2. Specifically, the degree of the color tone conversion is controlled based on the converting degree parameter such as the color difference between the reference image data 80 and the user image data 82 or the distance in color from the achromatic color in the original image data 84, the reference image data 80 or the user image data 82.

In this example, medium image data, which is obtained by performing a color tone conversion using a predetermined color tone conversion parameter on the original image data 84 is used.

The structure of the color tone conversion system 610 is similar to that shown in FIG. 5, FIG. 7, FIG. 8, FIG. 9 or FIG. 17. Thus, the user printer 200 is configured to control the degree of the color tone conversion using the color tone conversion parameter when printing image data.

The color tone conversion system 610 includes the image reading unit 41, the geometric transformation parameter estimation unit 42, a pixel correspondence data generating unit 51, a weighted value determination unit 54, a converting degree parameter obtaining unit 60 and a converted image data generating unit 62.

The converting degree parameter obtaining unit 60 includes a color difference obtaining unit 52 and a distance obtaining unit 53.

The converted image data generating unit 62 includes the color tone conversion unit 47 and an image data combining unit 55.

The image reading unit 41 and the geometric transformation parameter estimation unit 42 are the same as those shown in FIG. 10.

The image reading unit 41 reads the reference printed object and the user printed object which are obtained by printing the original image data 84, and generates the reference image data 80 and the user image data 82.

The geometric transformation parameter estimation unit 42 estimates the first and second geometric transformation parameters between the original image data 84 and the reference image data 80, and between the original image data 84 and the user image data 82, respectively.

The pixel correspondence data generating unit 51 (which is different from the pixel value correspondence data generating unit 43), detects the combination between each of the pixels of the reference image data 80 and the corresponding pixel of the user image data 82 using the first and second geometric transformation parameters, and generates pixel coordinate correspondence data in which the coordinates of the corresponding pixels correspond with each other.

The converting degree parameter obtaining unit 60 obtains a converting degree parameter, expressing a degree to be changed by color tone conversion, for each of a predetermined range of the original image data 84. As described above, the converting degree parameter may be the color difference between the reference image data 80 and the user image data 82 or the distance in color from the achromatic color in the original image data 84, the reference image data 80 or the user image data 82.

The color difference obtaining unit 52 obtains color difference between the reference image data 80 and the user image data 82 using the pixel value correspondence data and generates color difference data 90.

The distance obtaining unit 53 obtains the distance in color from achromatic color for each of a predetermined range of the original image data 84 for each of the color components and generates distance data 94. Alternatively, the distance obtaining unit 53 may obtain the distance in color from achromatic color for each of a predetermined range of the reference image data 80 or the user image data 82 for each of the color components. The reference image data 80 or the user image data 82 may have the same tendency as that of the original image data 84 for the distance data 94.

The weighted value determination unit 54 determines weighted values such that the lower the degree to be changed by the color tone conversion is, the smaller the value becomes, based on the converting degree parameter obtained by the converting degree parameter obtaining unit 60. The weighted value determination unit 54 generates combined weighted values as the weighted values from the color difference data 90 and the distance data 94.

The converted image data generating unit 62 generates weight-applied converted original image data 86 obtained by performing the color tone conversion by the color tone conversion parameter while applying the weighted values, on the original image data 84 for each of a predetermined range.

In this example, the color tone conversion unit 47 is an example of a medium image data generating unit. The color tone conversion unit 47 performs the color tone conversion on the original image data 84 using the predetermined color tone conversion parameter to generate the medium image data. Thus, the medium image data may be the same as the converted original image data 85 explained above. In this example, the color tone conversion parameter may be previously obtained.

The weighted value determination unit 54 determines weighted values to be applied to the medium image data when the medium image data and the original image data are combined.

The image data combining unit 55 performs weighting to the medium image data and the original image data 84 based on the determined weighted value and combines the medium image data and the original image data 84.

(Operation)

FIG. 19 is a flowchart showing an example of processes in which the color tone conversion system 610 generates pixel coordinate correspondence data.

The image reading unit 41 reads the reference printed object and the user printed object to generate the reference image data 80 and the user image data 82, respectively (S201).

The geometric transformation parameter estimation unit 42 estimates the first geometric transformation parameter between the original image data 84 and the reference image data 80, and the second geometric transformation parameter between the original image data 84 and the user image data 82 (S202). The geometric transformation parameter may be a displacement amount, a rotational angle or magnification, for example. The geometric transformation parameters may be obtained by a known technique such as a pattern matching using markers, a pattern matching without using markers, Phase-Only Correlation or the like. These methods are already described above when explaining the method of generating the color tone conversion parameter and will not be repeated.

After the first and second geometric transformation parameters are estimated, the pixel correspondence data generating unit 51 performs the geometric transformation on the reference image data 80 and the user image data 82 (S203). When applying the geometric transformation parameters, if the pixels of the image data before and after the transformation are not corresponded with each other because of a change in sub-pixel precision, rotation, size variation or the like, pixel values may be calculated using interpolation such as a bilinear interpolation, bicubic interpolation or the like.

The positions of the reference image data 80 and the user image data 82 are substantially matched with that of the original image data 84 by the geometric transformation. Thus, it can be considered that the pixels at the same coordinates of the reference image data 80 and the user image data 82 correspond with each other. The pixel correspondence data generating unit 51 obtains the first and second geometric transformation parameters to correspond the pixels in the reference image data 80 and the user image data 82 with each other.

Further, although the first geometric transformation parameter between the original image data 84 and the reference image data 80 and the second geometric transformation parameter between the original image data 84 and the user image data 82 are estimated in step S202, a geometric transformation parameter between the reference image data 80 and the user image data 82 may be estimated. In other words, the geometric transformation parameter for matching the positions of the reference image data 80 and the user image data 82 may be obtained, and then one of the reference image data 80 and the user image data 82 is performed with the obtained geometric transformation parameter so that the positions of the reference image data 80 and the user image data 82 can be substantially matched.

The geometric transformation in step S203 is not necessarily performed. Instead, when specifying the corresponding pixels of the original image data 84 and the reference image data 80 (or the user image data 82), coordinate conversion may be performed using the first geometric transformation parameter and the second geometric transformation parameter and then the corresponding pixels may be determined. In other words, even when the coordinate values between two image data are different in respective coordinate systems in which an origin of each of the image data is set as a reference, the pixels having the same coordinate value between the image data after performing the coordinate conversion can be referred to as the corresponding pixels.

There may be a case where a printed object obtained by printing the original image data 84 includes a space in a peripheral. Even in such a case, height or width of the space may be included in the displacement amount in the geometric transformation and the space does not influence a matching position. However, the space may be previously removed so that the origins of two image data match.

Then, color tone conversion is explained.

FIG. 20 is a flowchart showing an example of processes in which the color tone conversion system 610 performs the color tone conversion.

First, "obtain reference image data of reference printer" of step S210, and "print original image data by user printer to obtain user printed object" of S220 are explained with reference to FIG. 19. The processes of steps S210 and S220 are performed one time. If these processes are performed for plural times, the original image data 84, not the converted original image data (medium image data), may be used at any time.

Then, the user printed object (or user image data 82) is evaluated (S230). The color difference obtaining unit 52 may evaluate the user printed object. Then, by comparing the user printed object (or the user image data 82) and the reference printed object (or reference image data 80), the quality of the user printed object (or user image data 82) is evaluated (S240).

When the quality of the user printed object is appropriate in step S240 (YES in S240), the process is finished. However, the quality of the user printed object is not appropriate in step S240 (NO in S240), the process proceeds to step S250.

The method of evaluating the quality of the user printed object is similar to a method explained above with reference to steps S130 and S140 in FIG. 15 when generating the color tone conversion parameter.

When the user printed object it not appropriate (NO in S240), the color difference obtaining unit 52 obtains the color difference data 90 (S250). Specifically, the color difference obtaining unit 52 obtains the color difference between the reference image data 80 and the user image data 82 for each of the predetermined range (for each of the pixels or each group of the pixels) to form the color difference data 90. Thus, the color difference data 90 is managed as map data having the same size as the reference image data 80 and the user image data 82, and coordinates of the map data of the color difference data 90 are corresponded with coordinates of the reference image data 80 and the user image data 82. It means when the coordinates are the same, it is determined as corresponding pixels. The method of obtaining the color difference is similar to that explained in step S140 shown in FIG. 15. Here, if the color difference is used when evaluating the user printed object in step S140, the color difference for each of the pixels obtained in step S140 may be used as the color difference data 90.

The color difference data 90 may be processed as follows.
a) the map data is smoothed by moving average,
b) the map data is formed into map data with lower resolution (color differences of plural pixels are combined), or
c) removing outlines corresponding to the outlines of the reference image data 80 or the user image data 82 from the map data.

If the color difference is obtained for each of the pixels, a noise may be included in the color difference data 90. Thus, the map data may be processed to be smoothed or formed into the map data with lower resolution. Further, when removing the outlines in the map data, interpolation may be performed on the removed part so that the map data includes continuous pixels. Interpolation may be performed using a known technique such as a linear interpolation, cubic interpolation or the like, or smoothing.

Then, the distance obtaining unit 53 obtains the distance data 94 by obtaining a distance in color from achromatic color for each of a predetermined range (for each of the pixels or each group of the pixels) in the original image data 84 for each of the color components (S260). The distance data 94 may be managed as map data having the same size as the original image data 84, similar to the color difference data 90, or may be managed as a list in which the color components and the distances in color correspond with each other. An example of obtaining the distance data 94 is described in the following.
(1) convert the original image data 84 to be expressed by L*a*b* color space,
(2) select a color tone from the original image data 84 and obtain a distance $d^*_{ab}$ from achromatic color, and
(3) repeat (2) for all of the color tone in the original image data.

Then the processes (2) and (3) are performed for all of the color components.

Further, instead of the processes (2) and (3), the following processes may be performed after the process (1).
(2') select one or more of pixels in the predetermined range from the original image data 84 and obtain a distance $d^*_{ab}$ from achromatic color for the pixel value of the selected pixels, and (3') repeat (2') for all of the pixels in the original image data.

In the above process (2'), when more than one of pixels are included in the predetermined range, an average value or the like of the pixel values of the pixels is used.

As it is said that the color distance in the L*a*b* color space is similar to the difference in color recognized by human view, by converting the image data to be expressed in the L*a*b* color space, the color tones of the image data can reflect the difference in color recognized by human view.

The distance $d^*_{ab}$ in the L*a*b* color space may be expressed by the following equation 4.

$$d^*_{ab} = \sqrt{(a^*)^2 + (b^*)^2}$$ [Equation 4]

In the L*a*b* color space, when values of a* and b* are zero, it is the achromatic color. Thus, the distance $d^*_{ab}$ can be expressed by the length between a targeted point and the point having the achromatic color.

Then, the weighted value determination unit 54 determines the weighted value using the color difference data 90 and the distance data 94 (S270). An example of obtaining the weighted data is explained as follows. It is assumed that the color difference data 90 and the distance data 94 are managed as the map data.
(1) after dividing the values included in the color difference data 90 by a threshold value of color difference, the values greater than 1 are set to be 1, so that color difference weighted data is generated,
(2) after dividing the values included in the distance data 94 by a threshold value of distance, the values greater than 1 are set to be 1, so that distance weighted data is generated,
(3) multiplying the value of the color difference data 90 at a certain coordinate with a value of the distance data 94 at the corresponding coordinate to calculate the weighted value for the coordinate, and
(4) repeat the process (3) for all of the coordinates (pixels) of the color difference data 90 and the distance data 94.

The threshold value $th_{\Delta E}$ of color difference or the threshold value $th_d$ of distance may be previously set by the user, or may be statistically obtained such as an average value or median of the color difference data 90 or the distance data 94.

The threshold value $th_d$ of distance may be obtained by the following equation 5 using the maximum values $a^*_{max}$ and $b^*_{max}$, the maximum values of a* value and b* value of the L*a*b* color space.

$$th_d = \sqrt{(a^*_{max})^2 + (b^*_{max})^2}$$ [Equation 5]

The reason for dividing the values of the color difference data 90 and distance data 94 by the threshold values, respectively, is to have the weighted data include continuous values from zero to the threshold value. By varying the values of the weighted data to be continuous, the values of the combined image of the original image data 84 and the medium image data also become continuous. The reason for setting the values greater than 1 to be 1 is to have the values of the weighted data within zero to 1.

Figure 21A:
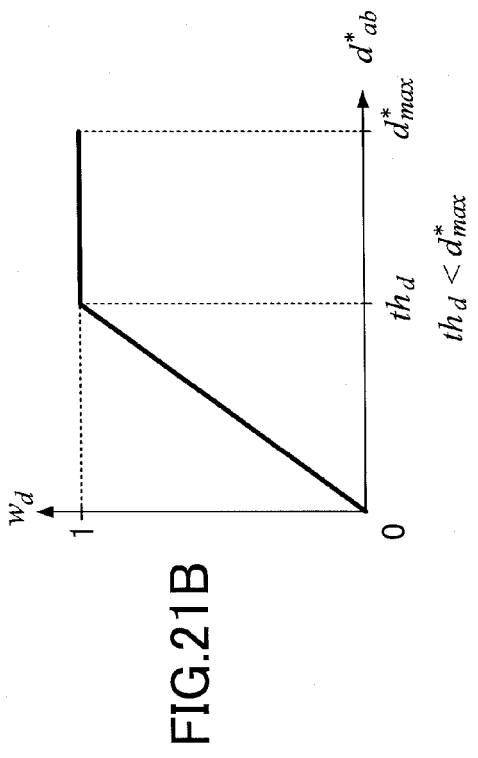
FIG. 21A to FIG. 21D are views showing an example of distance weighted data with respect to distance.

FIG. 21A shows an example of the distance weighted data when the maximum value of distance is used as the threshold value $th_d$ of distance. For example, for a case when the threshold value $th_d$ of distance is obtained by the above equation, the distance weighted data $w_d$ continuously varies from zero to 1 with respect to the distance $d^*_{ab}$, where the distance $d^*_{ab}$ is from zero to the maximum value $d^*_{max}$. The distance weighted data $w_d$ is 1 when the distance $d^*_{ab}$ is the maximum value $d^*_{max}$.

Figure 21B:
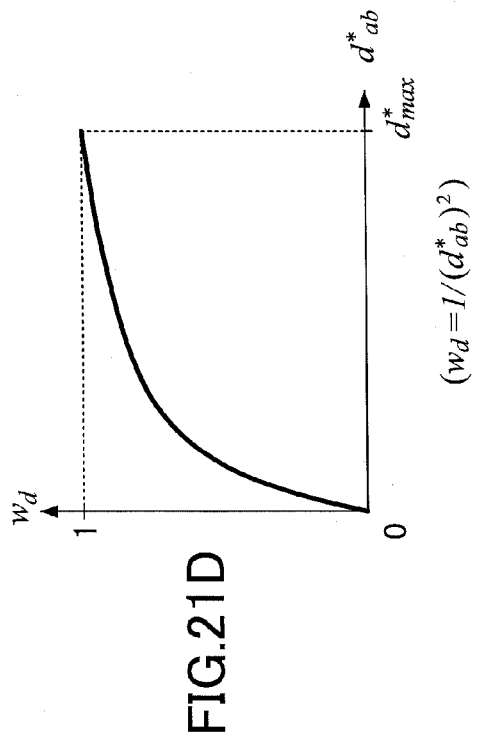

FIG. 21B shows an example of the distance weighted data when a value less than the $d^*_{max}$ is used as the threshold value $th_d$ of distance. The distance weighted data $w_d$ continuously varies from zero to 1 with respect to the distance $d^*_{ab}$, where the distance $d^*_{ab}$ is from zero to the threshold value $th_d$, and then, the distance weighted data $w_d$ is saturated to be 1.

Further, the distance weighted data $w_d$ may not be linearly varied, different from those shown in FIG. 21A or FIG. 21B, with respect to the distance.

Figure 21C:
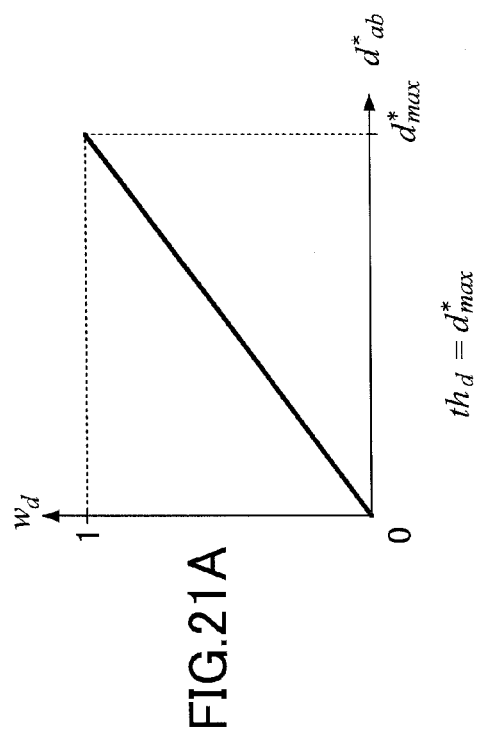
Figure 21D:
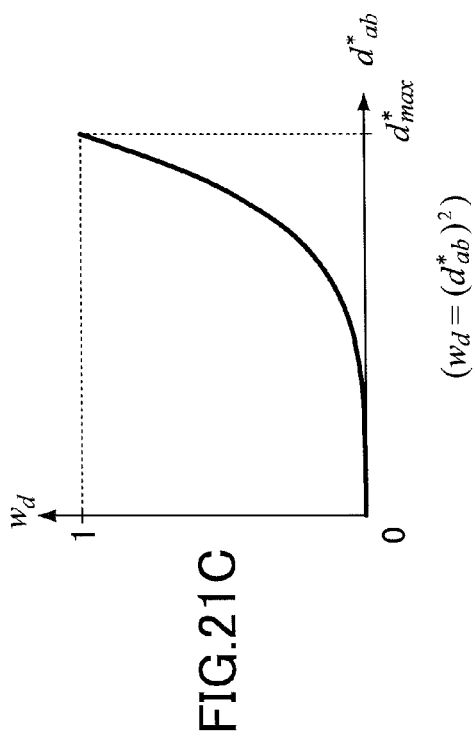

FIG. 21C and FIG. 21D show an example of the distance weighted data $w_d$ which is obtained by a nonlinear function. For an example of the function, quadric function, exponential function, inverse function or the like may be used. Further, the distance may be converted into the weighted data using previously predetermined information such as a look-up table or the like.

The color difference weighted data can be similarly obtained.

Figure 22A:
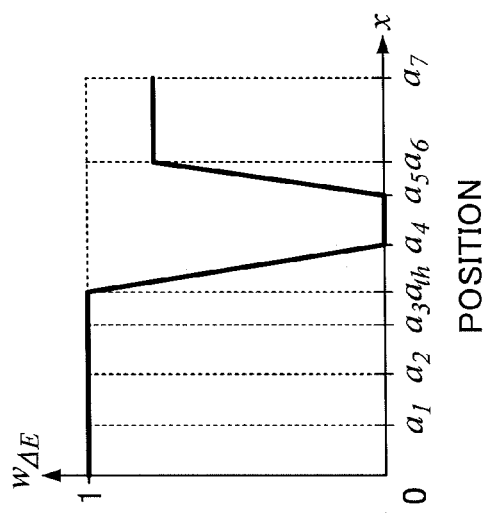
FIG. 22A and FIG. 22B are views for explaining a process of obtaining weighted values.

FIG. 22A is a view showing an example of a part of the color difference data 90. FIG. 22A shows an example of the color difference distribution, where axis of abscissas express a position $a_n$ (n is an integer greater than or equal to 0) of the pixel in the x direction or y direction in the map data, and axis of ordinates express a color difference. In FIG. 22A, the color differences between the positions $x=a_4$ to $x=a_5$ are zero.

Figure 22B:
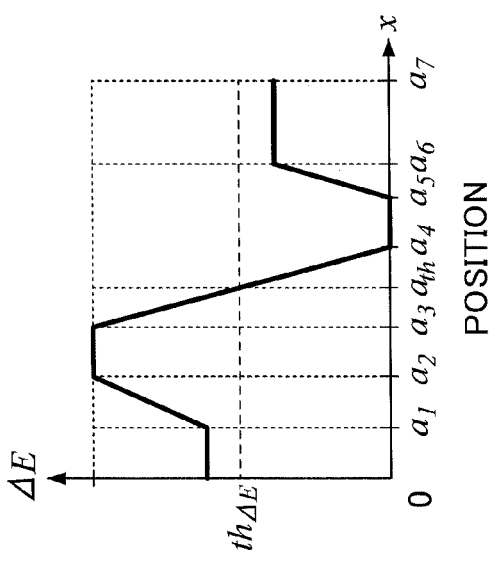

FIG. 22B shows an example of the color difference weighted data, where axis of abscissas express a position $a_n$ (n is an integer greater than or equal to 0) of the pixel in the x direction or y direction in the map data, and axis of ordinates express a color difference weighted value.

When the value of the color difference is greater than or equal to the threshold value $th_{\Delta E}$ of color difference from x=0 to $x=a_{th}$ in the color difference data 90 shown in FIG. 22A, the weighted values are set to be 1 in the difference weighted data shown in FIG. 22B. When the value of the color difference is zero from $x=a_4$ to $x=a_5$ in the color difference data 90 shown in FIG. 22A, the weighted values are set to be zero in the difference weighted data shown in FIG. 22B. For the rest of the ranges, the weighted values are converted in accordance with the value of the color difference.

Further, although the variations of the values of the color difference data 90 and the color difference weighted data are linearly expressed in FIG. 22A and FIG. 22B, the variations may be nonlinearly expressed or the color difference data 90 and the color difference weighted data may include a discontinuous part. Further, the data are shown in one dimension for explanation, the values of the color difference weighted data vary in two dimension in accordance with the variation of the color difference data 90.

The distance weighted data can be similarly obtained.

The weighted value determination unit 54 obtains the combined weighted value $W_T$ as follows. It is assumed that the color difference weighted value is Wc (0=<Wc=<1) and the distance weighted value is Wd (0=<Wd=<1) for each of the predetermined range.

$$W_T = Wc * Wd$$

When only the color difference weighted value Wc or only the distance weighted value Wd is used, the combined weighted value $W_T$ becomes as follows, respectively.

$$W_T = Wc$$

$$W_T = Wd$$

When the distance weighted values Wd are not obtained for each of the predetermined range, the distance weighted value corresponding to the color tone of the selected predetermined range of the original image data 84 is used.

Then, the color tone conversion unit 47 performs the color tone conversion on the original image data to generate the medium image data (S280). The color tone conversion unit 47 performs the color tone conversion on the original image data 84 to generate the medium image data using the color tone conversion parameter obtained by the method explained above with reference to FIG. 3 to FIG. 17 or previously obtained color tone conversion parameter. An example of the color tone conversion may be, (a) gamma correction, (b) correction in brightness, chroma or color tone, or (c) correction in contrast.

Thus, the medium image data is image data having the same size as the original image data 84. Further, in order to simplifying the process, the medium image data may be formed to have a lower resolution than that of the original image data 84.

Next, the image data combining unit 55 combines the original image data 84 and the medium image data (S290). The method of combining the original image data 84 and the medium image data to update the original image data 84 to form weight-applied converted original image data 86 is as follows.

(1) obtain a pixel value of a certain coordinate of the original image data 84,
(2) obtain a pixel value of the corresponding coordinate of the medium image data,
(3) obtain the weighted value of the corresponding coordinate from the weighted data,
(4) determine the combined pixel value of the corresponding coordinate in the combined image data (the weight-applied converted original image data 86) by weighted averaging the pixel values obtained in (1) and (2) by the weighted value obtained in (3),
(5) update the pixel value of the original image data 84 by substituting the pixel value by the combined pixel value determined in (4), and
(6) repeat the processes (1) to (5) for all of the coordinates to generate the weight-applied converted original image data 86.

The combined pixel value $G_T$ may be obtained as follows. Here, it is assumed that the combined weighted value is $W_T$ ($W_T = Wc * Wd$), the color difference weighted value is Wc ($0 = \langle Wc = \langle 1 \rangle$), the distance weighted value Wd ($0 = \langle Wd = \langle 1 \rangle$), the color tone of the original image data 84 is O, and the color tone of the medium image data is M, of the predetermined range.

$$G_T = W_T * M + (1 - W_T) * O$$

When only the color difference weighted value Wc or only the distance weighted value Wd is used, the combined pixel value $G_T$ becomes as follows, respectively.

$$G_T = Wc * M + (1 - Wc) * O$$

$$G_T = Wd * M + (1 - Wd) * O$$

Instead of updating the original image data 84 by the combined values, the weight-applied converted original image data 86 may be newly formed.

By using the weighted values when combining the original image data 84 and the medium image data, the following merits can be obtained.

(a) The color tone of the part where the color tone in the reference image data 80 and the user image data 82 originally match can be maintained.

As described above, if the color tone conversion is performed on the entirety of the original image data 84, the color tone of the "originally matched part" is also changed to be worse. In such a case, even if the entirety of the color tone of the output result by the user printer 200 become similar to that of the reference printed object, matching of the color tone at the originally matched part is lowered. On the other hand, according to the embodiment, the color difference weighted values are determined based on the color difference between the reference image data 80 and the user image data 82. Then, thus obtained color difference weighted values are reflected on the combined weighted values to be applied to the original image data 84 and the medium image data. Thus, the lowering of the matching of the color tone at the originally matched part can be prevented as follows.

As the color difference weighted data is configured such that lower weight is applied to the original image data 84 at the part where the matching of the color tone is originally high, while higher weight is applied to the medium image data at the part where the matching of the color tone is originally low. With this, in the weight-applied converted original image data 86 obtained by combining the original image data 84 and the medium image data, which is obtained by performing the color tone conversion, at the part where the matching of the color tone is originally high is relatively maintained at that of the original image data 84 and only the part where the matching of the color tone is originally low is relatively changed.

(b) Color tone is not applied to the part where the color tone is substantially achromatic color.

If the color tone conversion is performed on the entirety of the original image data, a color tone is added even at the "originally achromatic part". In such a case, even if the entirety of the color tone of the output result by the user printer 200 become similar to that of the reference printed object, matching of the color tone at the originally achromatic part is lowered. On the other hand, according to the embodiment, the distance weighted values are determined based on the distance from the achromatic color for each of the color components in the original image data. Then, thus obtained distance weighted values are reflected on the combined weighted values to be applied to the original image data 84 and the medium image data. Thus, the lowering of the matching of the color tone at the originally achromatic part can be prevented as follows.

As the distance weighted values are configured such that lower weight is applied to the original image data 84 at the part where the distance from the achromatic color is short, while higher weight is applied to the medium image data at the part where the distance from the achromatic color is long. With this, in the weight-applied converted original image data 86 obtained by combining the original image data 84 and the medium image data, which is obtained by performing the color tone conversion, at the part where the distance from the achromatic color is short is relatively maintained at that of the original image data 84 and only the part where the distance from the achromatic color is long is relatively changed.

The color tone conversion system 610 finishes the process when the color tone conversion is performed for a predetermined time (YES in S300). When it is determined to continue the color tone conversion in step S300 (NO in S300), the weight-applied converted original image data 86 is used as the original image data in step S220 to be printed by the user printer 200, and the same processes are performed.

When repeating the same processes, for steps S220 to S270, the weight-applied converted original image data 86 is used as the original image data. It is not necessary to perform the process of steps S160 to S180. However, if the process of these steps are performed, the original image data 84, not the weight-applied converted original image data 86, may be used in step S160. In step S170, any of the original image data 84 or the weight-applied converted original image data 86 may be used.

Further, in step S280, there may be the following cases.
(a) the current color tone conversion is performed on the weight-applied converted original image data 86, or (b) the current and the previous color tone conversions are performed on the original image data 85 in a combined manner.

Although for the process shown in FIG. 20, there are two steps S240 and S300 in which whether to finish the process is determined, it is not necessary to include all of two steps, however, one of the steps may be included.

Further, only one of the color difference weighted value and the distance weighted value may be used. The following merits can be obtained when using one of the color difference weighted value and the distance weighted value.

a) When Only the Color Difference Weighted Value is Used

The lowering of the matching of the color tone at the originally matched part can be prevented. However, the matching of the color tone at the originally achromatic part may be lowered.

In such a case, even for the achromatic color in the original image data 84, when printing the original image data 84 on a paper to obtain the reference printed object or the user printed object, the color tones in the reference image data 80 and the user image data 82 become different if the color tones of the printed papers are different.

b) When Only the Distance Weighted Value is Used

The lowering of the matching of the color tone at the originally achromatic part can be prevented. However, the matching of the color tone at the originally matched part may be lowered in this case.

Thus, by using the combined weighted value of the color difference weighted value and the distance weighted value, both of the merits of a) and b) can be obtained. In other words, synergy of the merits of using both of the color difference weighted value and the distance weighted value can be obtained.

However, for example, when it is desired to use the color tone of the paper of the reference printed object for the user printed object, only the color difference weighted value may be used. Further, for example, when it is desired to reproduce the color tone of the original image data 84 to the whole of the user printed object, only the distance weighted value may be used. In such a case, if the color difference weighted value is also used, there may be a problem that even for the pixels at which the color tone in the original image data 84 is the same may be expressed to be the different color tones in accordance with the color difference distribution between the reference printed object and the user printed object.

Further, in this example, although an example where the color space, which is used when reading the printed object by the scanner device 300, itself is used is described, the color space is a device dependent color space. Thus, the color space of the image data may be converted to a device-independent color space by using a color profile of the scanner device 300. The device-independent color space may be device-independent RGB color space, XYZ color space or the like. Further, the color space of the image data may be converted to a uniform color space such as L*a*b* color space or the like.

When the image data obtained by the scanner device 300 are expressed by the L*a*b* color space, it is necessary to convert the original image data to be expressed by the L*a*b* color space. Further, the estimation of the color tone reproduction characteristics, the determination of the color tone conversion parameter, and the color tone conversion are performed in the L*a*b* color space. Then, after the color tone conversion is performed, the image data is further converted to the original color space.

As described above, a problem may be caused by performing the color tone conversion on the entirety of the original image data 84. Thus, it is necessary to control the degree of the color tone conversion using the color tone conversion parameter. For controlling the degree, one method is to combine the original image data 84 and the medium image data, which is explained above. Further, another method in which the magnitude of the color tone conversion parameter is changed in accordance with the positions of the original image data 84 using the combined weighted values may be used. This example is explained in the following.

Another Example

Although an example where the color tone conversion system 610 is explained to include the color tone conversion unit 47 and an image data combining unit 55 and the medium image is formed by the color tone conversion unit 47 is explained above, the weight-applied converted original image data 86 may be generated without using the medium image data as follows.

In the above example, the original image data 84 and the medium image data, which is obtained by performing the color tone conversion on the original image data 84, are combined using the combined weighted values (including a case where one of the color difference weighted values and the distance weighted values is used).

However, in this example, the weight-applied converted original image data 86 is generated by reflecting the combined weighted values on the color tone conversion parameter, and then applying the thus obtained color tone conversion parameter on the original image data 84, without using the medium image data.

FIG. 26 is a flowchart showing an example of processes in which the color tone conversion system 610 performs the color tone conversion.

The processes are similar to those shown in FIG. 20 except that step S282 is included instead of step S280 and step S290. The converted image data generating unit 62 performs the color tone conversion on the original image data 84 using the color tone conversion parameter which is corrected by the combined weighted values to generate the weight-applied converted original image data 86.

Examples of the color tone conversion by the converted image data generating unit 62 are explained in the following.

(a) Case when Gamma Correction is Used in the Color Tone Conversion

In this case, the gamma-values are changed in accordance with the combined weighted values at the respective coordinates of the original image data 84. For example, the difference value of the gamma-value from 1 may be controlled to be changed by the combined weighted values. At this time, the gamma-value $\gamma_w(x, y)$ corresponding to the coordinate (x, y) of the original image data 84 can be obtained by the following equation 6 using the combined weighted value $w_T(x, y)$ at the coordinate and the gamma-value $\gamma$ of the color tone conversion.

$$\gamma_w(x,y) = w_T(x,y)(\gamma - 1) + 1 \qquad \text{[Equation 6]}$$

(b) Case when a Look-Up Table is Used in the Color Tone Conversion

In this case, the values in the look-up table are changed in accordance with the combined weighted values at the respective coordinates of the original image data 84. Similar to case (a), the values in the look-up table may be changed based on the combined weighted values. At this time, the value $T_w(x, y)$ in the look-up table corresponding to the coordinate (x, y) of the original image data 84 can be obtained by the following equation 7 using the combined weighted value $w_T(x, y)$ at the coordinate and the original value T of the color tone conversion parameter in the look-up table.

$$T_w(x,y) = w_T(x,y)(T-L) + L \quad \text{[Equation 7]}$$

Here, L is a value of a look-up table by which an output value becomes the same as an input value. In other words, L is an input value (pixel value of the original image data 84).

Figure 22C:
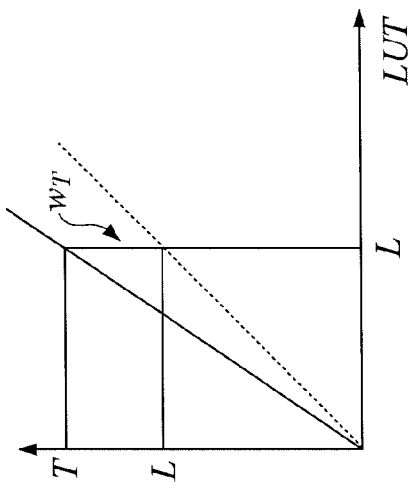
FIG. 22C is a view for explaining a process of obtaining a value in a look-up table.

FIG. 22C is a view for explaining a method of obtaining the value $T_w(x, y)$ in the look-up table. It is assumed that the value L is originally converted to the value T by the look-up table. In such a case, the weighted value $w_T$ is applied to (T−L), which is the difference between T and L. With this, the weighted values are applied only to the differences by the look-up table.

Further, for the user printer 200 or the reference printer 400, an offset printing machine or a gravure printing machine may be used, and for the image reading unit 41, a spectrophotometer or a camera may be used.

Further, as shown in FIG. 17, instead of the reference printer 400, the user printer 200 and the scanner device 300, the display 109, the projector 800 and the digital camera 900 may be used, respectively. In this case, the reference printed object corresponds to a reference displayed image and the user printed object corresponds to a user displayed image.

Further, when the display or the projector is used as an example of the image output apparatus, L*u*v* color space may be used as a uniform color space instead of L*a*b* color space, which is a uniform color space for the printer or the like.

Another Example

In this example, a case when the color tone conversion parameter is generated by the color tone conversion system 610 is explained.

The structure of the color tone conversion system 610 is similar to that shown in FIG. 5, FIG. 7, FIG. 8, FIG. 9 or FIG. 17.

Figure 23:
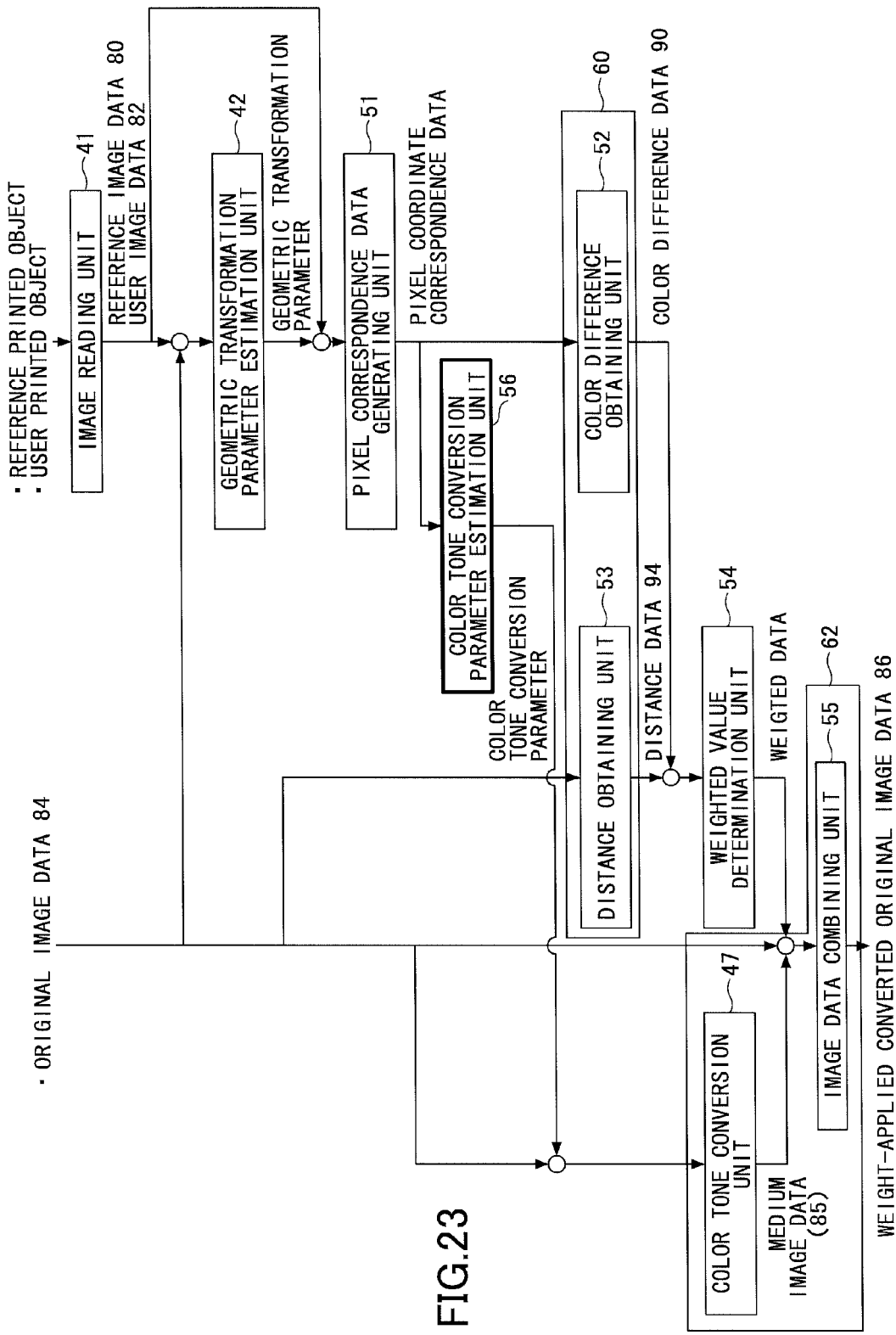
FIG. 23 is a block diagram showing an example of a functional structure of a color tone conversion system.

FIG. 23 is a block diagram showing an example of a functional structure of the color tone conversion system 610. The explanation of the same components shown in FIG. 10 or FIG. 18 is not repeated. The color tone conversion system 610 of the example further includes a color tone conversion parameter estimation unit 56 in addition to the components of the color tone conversion system 610 shown in FIG. 18. The color tone conversion parameter estimation unit 56 estimates the color tone conversion parameter.

Figure 24:
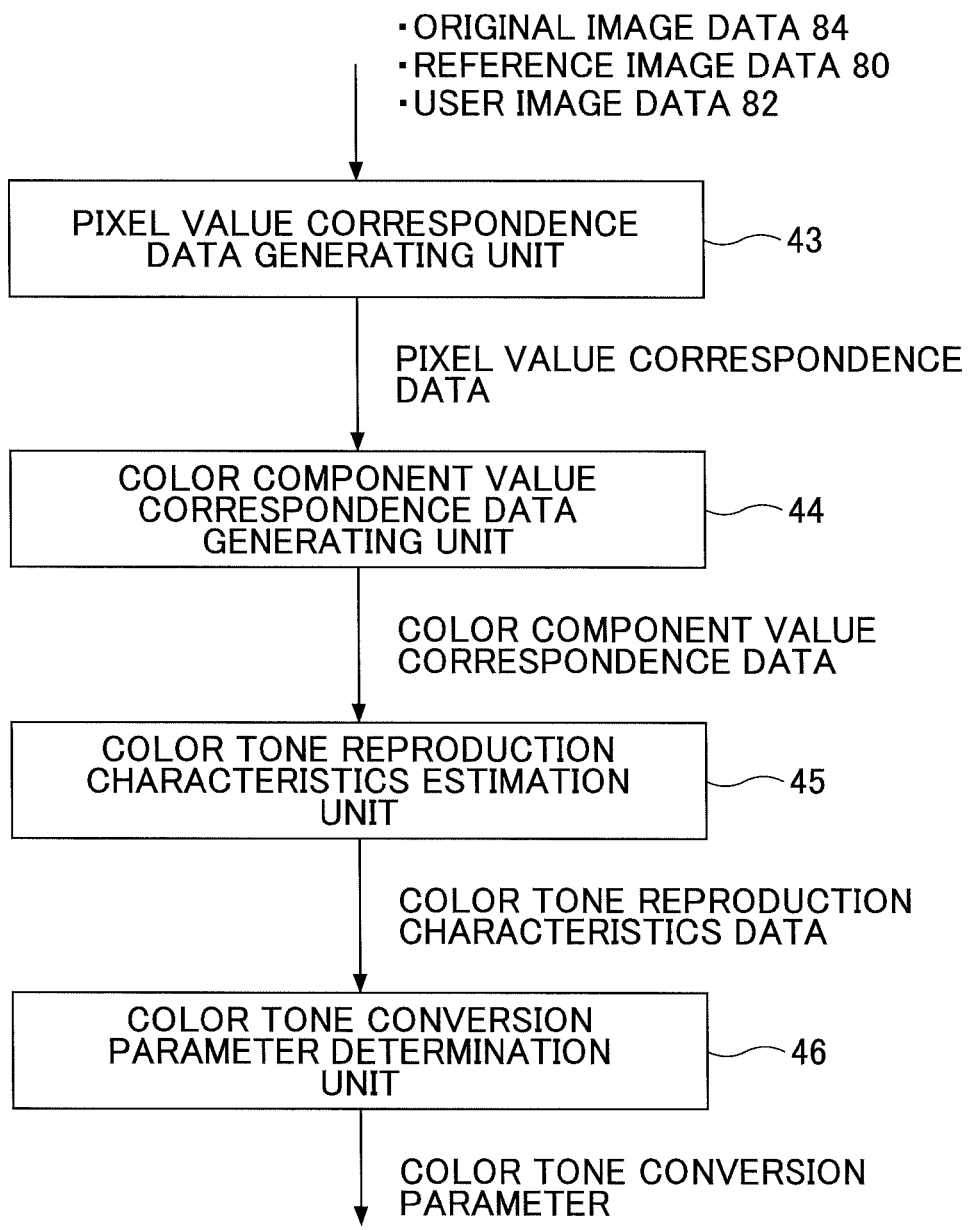
FIG. 24 is a block diagram showing an example of a functional structure of a color tone conversion parameter estimation unit.

FIG. 24 is a block diagram showing an example of a functional structure of the color tone conversion parameter estimation unit 56 in detail.

The color tone conversion parameter estimation unit 56 includes the pixel value correspondence data generating unit 43, the color component value correspondence data generating unit 44, the color tone reproduction characteristics estimation unit 45 and the color tone conversion parameter determination unit 46.

The pixel value correspondence data generating unit 43 detects a pixel of the reference image data 80 (or the user image data 82) corresponding to each of the pixels of the original image data 84 using the first (or second) geometric transformation parameter and generates the first (or second) pixel value correspondence data in which the pixel values of the corresponding pixels of the reference image data 80 (or the user image data 82) and the original image data 84 correspond with each other.

The color component value correspondence data generating unit 44 generates first (or second) color component value correspondence data in which the color component values of the corresponding pixels of the original image data 84 and the reference image data 80 (or the user image data 82) correspond with each other based on the first (or second) pixel value correspondence data.

The color tone reproduction characteristics estimation unit 45 estimates the color tone reproduction characteristics data using the first (or second) color component value correspondence data.

The color tone conversion parameter determination unit 46 determines the color tone conversion parameter using the color tone reproduction characteristics data. These operations are the same as those explained with reference to FIG. 10, and the explanation is not repeated.

FIG. 25 is a flowchart showing an example of a process in which the color tone conversion system 610 performs the color tone conversion. The process is the same as a combination of steps S210 to S270 of FIG. 20, steps S160 to S180 of FIG. 15 and steps S280 to S300 of FIG. 20. Thus, the explanation is not repeated.

When the color tone conversion is performed by using the estimated color tone conversion parameter when the reference color chart is not obtained, there is a problem that matching of the color tone at the originally matched part becomes lowered or a color tone is added to the originally achromatic part.

However, by controlling the degree of the color tone conversion using the weighted data, matching of the color tone at the originally matched part and the originally achromatic part can be maintained.

The individual constituents of the color tone conversion system 600, the color tone conversion system 610 or the MFP 700 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

According to the embodiment, an image processing apparatus and an image processing system capable of appropriately correcting color tones of a user image output apparatus by suppressing unnecessary color tone conversion can be provided.

Further, the following modification may be included.

(1). An image processing apparatus for reproducing color tones of a reference output result obtained by outputting original image data by a reference image output unit, in a target output result obtained by outputting the original image data to which color tone conversion using a color tone conversion parameter is performed by a target image output unit, comprising:

a geometric transformation parameter estimation unit that estimates geometric transformation parameters for matching positions of reference image data obtained by reading the reference output result by a reading unit, and target image data obtained by reading the target output result by a reading unit;

a color tone conversion unit that performs the color tone conversion on the original image data using the color tone conversion parameter to generate medium image data;

a color difference obtaining unit that obtains color difference between the reference image data and the target image data for each pixel or each block of pixels, or a distance obtaining unit that obtains distance from achromatic color for each pixel or each block of pixels, or each color component in the original image data, the reference image data or the target image data;

a weighted value determination unit that determines weighted values based on at least one of the color difference and the distance for each pixel or each block of pixels of the medium image data; and an image data combining unit that combines the original image data and the medium image data by calculating the pixel values of the original image data and the medium image data to which the weighted values are applied.

(2). An image processing apparatus for reproducing color tones of a reference output result obtained by outputting original image data by a reference image output unit, in a target output result obtained by outputting the original image data to which a color tone conversion using a color tone conversion parameter is performed by a target image output unit, comprising:

a geometric transformation parameter estimation unit that estimates geometric transformation parameters for matching positions of reference image data obtained by reading the reference output result by a reading unit, and target image data obtained by reading the target output result by a reading unit;

a color difference obtaining unit that obtains color difference between the reference image data and the target image data for each pixel or each block of pixels, or a distance obtaining unit that obtains distance from achromatic color for each pixel or each block of pixels, or each color component in the original image data, the reference image data or the target image data;

a weighted value determination unit that determines weighted values based on at least one of the color difference and the distance for each pixel or each block of pixels of the original image data; and a color tone conversion unit that performs the color tone conversion on the original image data using the color tone conversion parameter which is corrected by the weighted values.

Although a preferred embodiment of the color tone conversion system or a color tone conversion apparatus has been specifically illustrated and described, it is to be understood that minor modifications may be made therein without departing from the sprit and scope of the invention as defined by the claims.

The present invention is not limited to the specifically disclosed embodiments, and variations and modifications may be made without departing from the scope of the present invention.

The present application is based on Japanese Priority Application No. 2011-161261 filed on Jul. 22, 2011, the entire contents of which are hereby incorporated herein by reference.

What is claimed is:

1. An image processing apparatus for performing color tone conversion on a predetermined original image data using a predetermined color tone conversion parameter which is adjusted such that color tones of an output result obtained by outputting the original image data after being performed with the color tone conversion parameter by a target image output unit reproduces color tones of a reference output result, comprising:

a converting degree parameter obtaining unit that obtains a converting degree parameter expressing a degree to be changed by the color tone conversion for each of a predetermined range of the original image data based on at least one of the original image data, reference image data obtained from the reference output result and target image data obtained from a target output result which is obtained by outputting the original image data by the target image output apparatus;

a weighted value determination unit that determines weighted values for each of the predetermined range such that the lower the degree to be changed by the color tone conversion is, the smaller the value becomes, based on the converting degree parameter obtained by the converting degree parameter obtaining unit; and a converted image data generating unit that generates weight-applied converted original image data obtained by performing the color tone conversion by the color tone conversion parameter while applying the weighted values, on the original image data for each of the predetermined range.

2. The image processing apparatus according to claim 1, wherein the converting degree parameter obtaining unit obtains at least one of a color difference between the reference image data and the target image data and a distance in color from achromatic color in the original image data, the reference image data or the target image data, as the converting degree parameter, and wherein the weighted value determination unit determines the weighted values such that the larger the color difference is, the higher the value becomes when the converting degree parameter obtaining unit obtains the color difference as the converting degree parameter, and determines the weighted values such that the larger the distance is, the higher the value becomes when the converting degree parameter obtaining unit obtains the distance as the converting degree parameter.

3. The image processing apparatus according to claim 1, wherein the converted image data generating unit includes a medium image data generating unit that generates medium image data by performing the color tone conversion on the original image data using the color tone conversion parameter, and an image data combining unit that combines the original image data and the medium image data to generate the weight-applied converted original image data such that the weighted values determined by the weighted value determination unit are reflected at least on the pixel values of the medium image data.

4. The image processing apparatus according to claim 1, wherein the converted image data generating unit performs the color tone conversion on the original image data to generate the weight-applied converted original image data using the color tone conversion parameter which is corrected by the weighted values.

5. The image processing apparatus according to claim 2, wherein the converting degree parameter obtaining unit is configured to obtain both the color difference and the distance as the converting degree parameter, and the weighted value determination unit determines the weighted values by calculating the weighted values obtained based on the color difference and the weighted values obtained based on the distance when the converting degree parameter obtaining unit obtains both the color difference and the distance as the converting degree parameter.

6. The image processing apparatus according to claim 2, further comprising:

a geometric transformation parameter estimation unit that estimates geometric transformation parameters for matching positions of the reference image data and the target image data; and a pixel correspondence data generating unit that generates pixel correspondence data in which pixels of the reference image data and the target image data correspond with each other, based on the geometric transformation parameter, and wherein the converting degree parameter obtaining unit obtains the color difference between the reference image data and the target image data based on the pixel correspondence data.

7. The image processing apparatus according to claim 2, further comprising:

a geometric transformation parameter estimation unit that estimates a first geometric transformation parameter for matching the positions of the original image data and the reference image data, and a second geometric transformation parameter for matching the positions of the original image data and the target image data; and a pixel correspondence data generating unit that generates pixel correspondence data in which pixels of the reference image data and the target image data correspond with each other, by geometric transformation on the reference image data using the first geometric transformation parameter and geometric transformation on the target image data by the second geometric transformation parameter, and wherein the converting degree parameter obtaining unit obtains the color difference between the reference image data and the target image data based on the pixel correspondence data.

8. The image processing apparatus according to claim 1, further comprising:

a geometric transformation parameter estimation unit that estimates a first geometric transformation parameter for matching the positions of the original image data and the reference image data, and a second geometric transformation parameter for matching the positions of the original image data and the target image data; and a pixel correspondence data generating unit that generates pixel correspondence data in which pixels of the reference image data and the target image data correspond with each other, by geometric transformation on the reference image data using the first geometric transformation parameter and geometric transformation on the target image data by the second geometric transformation parameter, a color component value correspondence data generating unit that generates first color component value correspondence data in which color component values of the corresponding pixels of the reference image data and the original image data correspond with each other and second color component value correspondence data in which color component values of the target image data and the original image data correspond with each other, using the pixel correspondence data; and a color tone conversion parameter determination unit that generates the color tone conversion parameter in which a pair of pixel values of the original image data that correspond to the pixel values of the reference image data and the target image data which become the substantially the same correspond with each other.

9. The image processing apparatus according to claim 8, wherein the color tone conversion parameter determination unit reads a first pixel value which is corresponded with a selected pixel value of the original image data from the first color component value correspondence data, reads a second pixel value which is corresponded with the first pixel value in the second color component value correspondence data, and stores the selected pixel value and the second pixel value as the pair as the color tone conversion parameter.

10. The image processing apparatus according to claim 9, wherein the color component value correspondence data generating unit generates the first color component value correspondence data and the second color component value correspondence data after converting the pixel values of the original image data, the reference image data and the target image data to be expressed by a device-independent color space.

11. The image processing apparatus according to claim 10, wherein the color tone conversion parameter determination unit determines whether the generated color tone conversion parameter is appropriate based on at least one of whether the color tone conversion parameter is within a predetermined range, and whether the difference in pixel values of image data before and after being converted by the color tone conversion parameter meets the predetermined standard.

12. An image processing system, comprising:

a target image output unit that outputs a predetermined original image data obtained from a reference output result as a target output result;

a reading unit that reads the target output result;

a data processing apparatus that performs color tone conversion on the original image data using a predetermined color tone conversion parameter which is adjusted such that color tones of an output result obtained by outputting the original image data after being performed with the color tone conversion parameter by the target image output unit reproduces color tones of the reference output result, including, a converting degree parameter obtaining unit that obtains a converting degree parameter expressing a degree to be changed by the color tone conversion for each of a predetermined range of the original image data based on at least one of the original image data, reference image data obtained from the reference output result and target image data obtained from a target output result which is obtained by outputting the original image data by the target image output apparatus, a weighted value determination unit that determines weighted values for each of the predetermined range such that the lower the degree to be changed by the color tone conversion is, the smaller the value becomes, based on the converting degree parameter obtained by the converting degree parameter obtaining unit; and a converted image data generating unit that generates weight-applied converted original image data obtained by performing the color tone conversion by the color tone conversion parameter while applying the weighted values, on the original image data for each of the predetermined range.

13. The image processing system according to claim 12, wherein the converting degree parameter obtaining unit obtains at least one of a color difference between the reference image data and the target image data and a distance in color from achromatic color in the original image data, the reference image data or the target image data, as the converting degree parameter, and wherein the weighted value determination unit determines the weighted values such that the larger the color difference is, the higher the value becomes when the converting degree parameter obtaining unit obtains the color difference as the converting degree parameter, and determines the weighted values such that the larger the distance is, the higher the value becomes when the converting degree parameter obtaining unit obtains the distance as the converting degree parameter.

14. The image processing system according to claim 12, wherein the target image output unit output the weight-applied converted original image data to obtain an output result.

\* \* \* \* \*